United States Patent
Mao

(10) Patent No.: US 7,548,435 B2
(45) Date of Patent: Jun. 16, 2009

(54) ZERO-VOLTAGE-SWITCHING DC-DC CONVERTERS WITH SYNCHRONOUS RECTIFIERS

(75) Inventor: Hong Mao, Orlando, FL (US)

(73) Assignee: Astec International Limited, Kwun Tong, Kowloon (HK)

( * ) Notice: Subject to any disclaimer, the term of this patent is extended or adjusted under 35 U.S.C. 154(b) by 154 days.

(21) Appl. No.: 11/485,007

(22) Filed: Jul. 12, 2006

(65) Prior Publication Data

US 2007/0230228 A1 Oct. 4, 2007

Related U.S. Application Data

(60) Provisional application No. 60/788,594, filed on Mar. 31, 2006.

(51) Int. Cl.
*H02M 3/335* (2006.01)
(52) U.S. Cl. .............................. 363/16; 363/17; 363/98; 323/266
(58) Field of Classification Search ......... 323/282–290; 363/16–20, 39, 40, 44–48, 127
See application file for complete search history.

(56) References Cited

U.S. PATENT DOCUMENTS

| 4,857,822 | A | * | 8/1989 | Tabisz et al. ................. 323/282 |
| 6,069,803 | A | * | 5/2000 | Cross ....................... 363/21.14 |
| 6,862,195 | B2 | * | 3/2005 | Jitaru .......................... 363/17 |

OTHER PUBLICATIONS

"Zero-Voltage Switching Technique in DC-DC Converters" K.H. Liu, F.C. Lee, IEEE Power Electronics Conference Proceedings, pp. 293-304, 1986.

"Variation of Quasi Resonant DC/DC Converter Topologies" T. Zheng, D.Y. Chen and F.C. Lee, IEEE Power Electronics Conference Proceedings, pp. 381-392, 1986.

"Zero-Voltage Switching in High Frequency Power Converters Using Pulse Width Modulation," C.P. Henze, H.C. Matrin and D.W. Parsley, IEEE Applied Power Electronics Conference Proc., pp. 33-40, 1988.

"Quasi-Square Wave Converter: Topologies and Analysis," V. Vorperian, IEEE Transactions on Power Electronics, vol. 3, No. 2, pp. 183-191, Apr. 1988.

"Non-resonant Converter For Megahertz Switching," Koosuke Harada and Hiroshi Sakamoto, IEEE Power Electronics Conference, pp. 889-894, 1989.

"A Family of Single-Switch ZVS-CV DC-to-DC Converters," Takerou Mizoguchi, Takashi Ohgai and Tamotsu Ninomiya, IEEE Power Electronics Conference Proceedings, pp. 1392-1398, 1994.

(Continued)

*Primary Examiner*—Rajnikant B Patel
(74) *Attorney, Agent, or Firm*—Harness, Dickey & Pierce, P.L.C.

(57) ABSTRACT

A DC-DC converter includes an inductor, a synchronous rectifier (SR) connected to the inductor, and an active switch connected to the inductor and the SR. An active resonant tank (ART) cell is connected to the SR or a transformer in parallel such that a resonant capacitor of the ART cell is charged through the active switch and discharged through the synchronous rectifier so that during a switch transition period energy is pumped out of the resonant capacitor by activating the ART cell to eliminate reverse recovery switching loss and achieve Zero Voltage Switching (ZVS).

38 Claims, 25 Drawing Sheets

OTHER PUBLICATIONS

"A Technique for Reducing Rectifier Reverse-Recovery-Related Losses in High-Voltage High-Power Boost Converters," Milan M. Jovanovic, IEEE Applied Power Electronics Conf. Proc., pp. 1000-1007, 1997.

"A Family of Compound Active-Clamping DC-DC Converters," Gang Chen, Dehong Xu, Bo Fend and Yousheng Wang, IEEE Applied Power Electronics Conf. Proc., pp. 850-856, 2002.

"A New Class of Zero-Voltage-Switched-PWM Converters," Guichao Hua and Fred C. Lee, High Frequency Power Conversion Conference, pp. 244-251, 1991.

"Novel Zero-Voltage-Transition PWM Converters," G. Hua, C.S. Leu, Y. Jiang and F.C. Lee, IEEE Transactions on Power Electronics, vol. 9, No. 2, pp. 213-219, Mar. 1994.

* cited by examiner

Zeta

ZERO-VOLTAGE-SWITCHING DC-DC CONVERTERS WITH SYNCHRONOUS RECTIFIERS

CROSS-REFERENCE TO RELATED APPLICATION

This application claims the benefit of U.S. Provisional Application No. 60/788,594 filed on Mar. 31, 2006, the entire disclosure of which is incorporated herein by reference.

FIELD

The present disclosure is related to dc-dc converters and more particularly, to zero voltage switching converters using synchronous rectification.

BACKGROUND

The statements in this section merely provide background information related to the present disclosure and may not constitute prior art.

In low-output-voltage dc-dc converters, synchronous rectifiers (SR) are widely used to reduce rectifier conduction loss and improve converter efficiency. However, during a switch's transition, an SR's parasitic body diodes unavoidably carry load current decreasing conversion efficiency because a voltage drops across an SR body diode is much higher than in the switch. In addition, the SR body diode's reverse recovery increases switching losses and electromagnetic interference (EMI).

Today's powering requirements demand fast transient response and high power density and as a consequence converter switching frequencies are increased, resulting in increased switching loss.

Recently, soft-switching techniques have been developed to attempt to reduce switching losses and EMI noises. In particular, zero voltage switching (ZVS) techniques have been used for MOSFET-type switches. ZVS multi-resonant converters (MRC) utilize major parasitic characteristics of the power stages. Typically, all semiconductor devices in an MRC operate with ZVS substantially reducing the switching losses and noise. Quasi-resonant converters (QRC) have been used to overcome the disadvantages of conventional pulse-width modulation (PWM) converters operating at high switching frequencies. QRCs achieve this through ZVS for an active switch and zero current switching (ZCS) for a rectifier diode. However, the switches in both QRCs and MRCs must withstand high voltage stress or high current stress. These stresses restrict the applications of QRCs and MRCs.

Reducing a filter inductance in conventional PWM converters, a ZVS quasi-square-wave (QSW) technique is known to offer ZVS for both active and passive switches without increasing the switches's voltage stress. However, QSW converters suffer high current stress in components resulting in significant conduction losses and forcing the active switches to turn off at high currents.

A similar concept to QSW includes an LC cell in parallel with either the active switch or the rectifier diode, depending on the type of converter. The LC cell typically includes a small inductor, $L_r$, in series with a large capacitor $C_c$. The LC cell's high inductor current ripple achieves ZVS turn-on for the active switch. However, the LC cell's current ripple in inductor $L_r$ may be more than twice the ripple in the filter inductor, and the associated conduction and turn-off losses increase significantly.

To achieve ZVS while preserving the advantages of the PWM technique, hybrid topologies are known to incorporate a PWM technique along with resonant converters to minimize circulating energy, conduction loss, and switching loss. Adding an auxiliary switch across the resonant converter in a ZVS-QRC derives a ZVS-PWM converter, which can be considered hybrid circuits of ZVS-QRCs and PWM converters. In these hybrid designs ZVS is typically achieved for the active (power) switch and the converter operates at a constant swathing frequency. However, the power switch is subjected to high voltage stress proportional to the load.

Compared with ZVS-PWM converters, known zero-voltage-transition PWM (ZVT-PWM) converters may be more desirable because soft switching is achieved without increasing switch voltage and current stress. By adding an auxiliary shunt network to discharge switch junction capacitance and shift the rectifier diode current, ZVS is achieved for switch and reverse recovery of the rectifier diode is attenuated, though not eliminated.

In recent years, synchronous rectification has been widely used in low-voltage applications. It is also desirable to use synchronous rectification with higher voltage levels since today's high-voltage MOSFET on-resistance is continually being reduced such that a voltage drop across the MOSFETs are comparable with that of fast-recovery diodes. However, the reverse recovery of a MOSFET's body diodes is a barrier to SR higher voltage applications. For example, SRs with 200V and higher ratings are typically not found in such applications, because the SR body diode's reverse recovery becomes significantly worse as the voltage rating increases; this significantly increases switch and body diode switching losses and the reverse recovery related EMI noise may lead to converter malfunction.

It is also known to reduce rectifier reverse-recovery-related losses in high-voltage boost converters, which can be applied to applications with SRs replacing diodes. However, these techniques only provide a compromised solution since the reverse recovery of diodes is attenuated instead of eliminated.

Therefore, there is a need for a high switching frequency switching ZVS dc-dc converter using an SR, while eliminating body diode conduction loss and reverse recovery loss.

SUMMARY

A dc-dc converter includes an inductor, a synchronous rectifier SR connected to the inductor, and an active switch connected to the inductor and the SR. An active resonant tank (ART) cell is connected to the SR in parallel such that a resonant capacitor of the ART cell is charged through the active switch and discharged through the synchronous rectifier. During a switch transition period energy is pumped out of the resonant capacitor by activating the ART cell to eliminate reverse recovery switching loss and achieve Zero Voltage Switching (ZVS).

Another dc-dc converter disclosed includes a transformer having a primary winding and a secondary winding. At least two synchronous rectifiers are connected to the secondary winding. An ART tank cell is connected to the primary side in parallel such that a resonant capacitor of the active resonant tank cell is charged through the active switch and discharged through the synchronous rectifier. During a switch transition period energy is pumped out of the resonant capacitor by activating the ART cell to eliminate reverse recovery switching loss and achieve zero voltage switching.

Still another dc-dc converter disclosed includes a transformer having a primary winding and a secondary winding. At least two synchronous rectifiers are connected to the secondary winding. An external winding is coupled to the primary winding. First and second ART cells are connected to the external winding in parallel such that resonant capacitors of the active resonant tank cells are charged through the active switch and discharged through the synchronous rectifier. During a switch transition period energy is pumped out of the resonant capacitors by activating at least one of the ART cells to eliminate reverse recovery switching loss and achieve zero voltage switching.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIGS. 1a-c show prior art buck, boost, and buck-boost cells;

Figure 6:
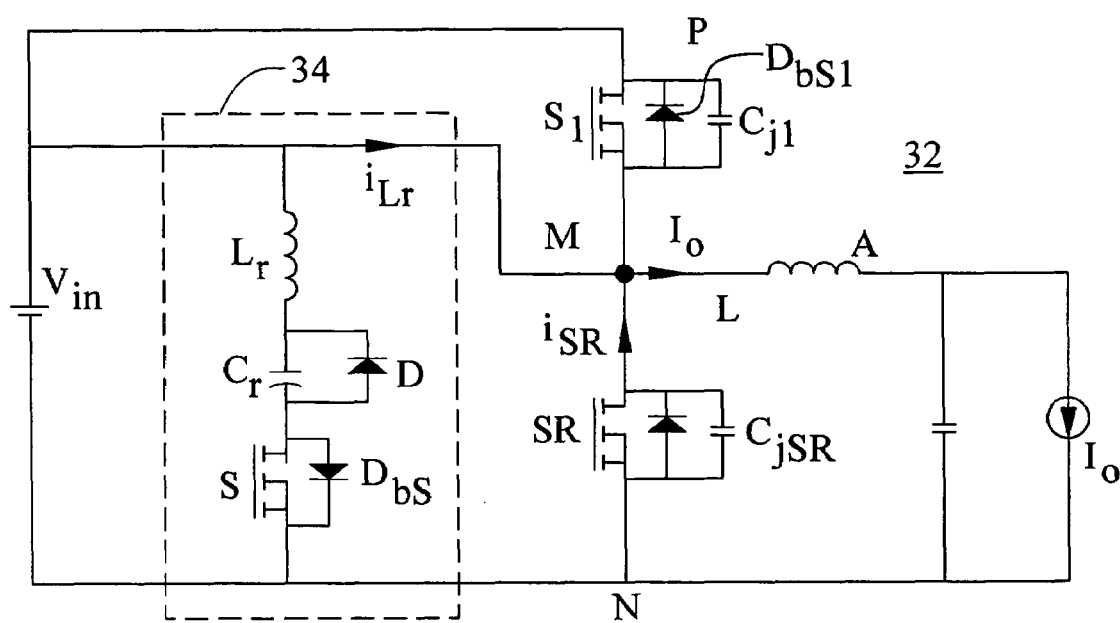
Figure 7:
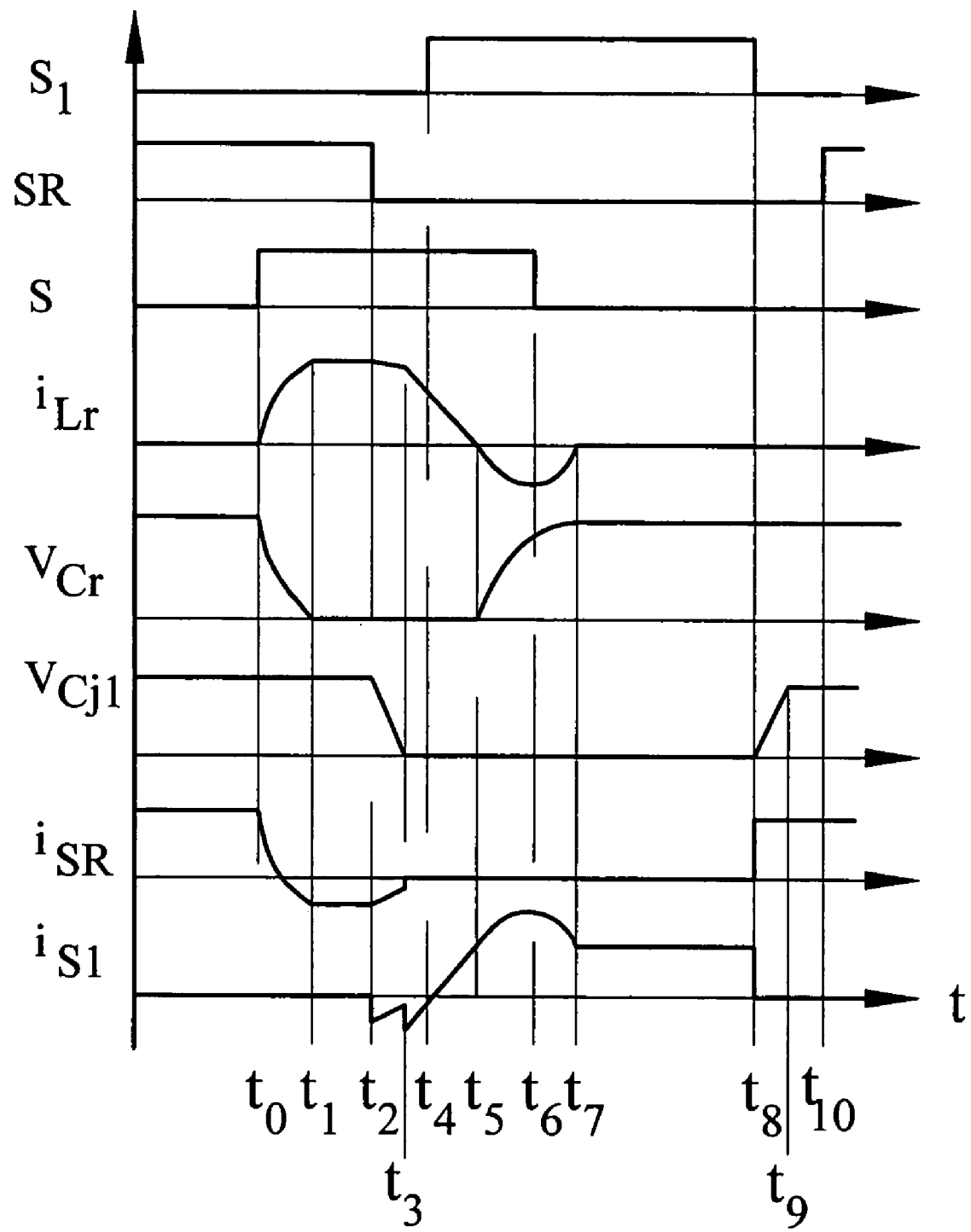
Figure 9A:
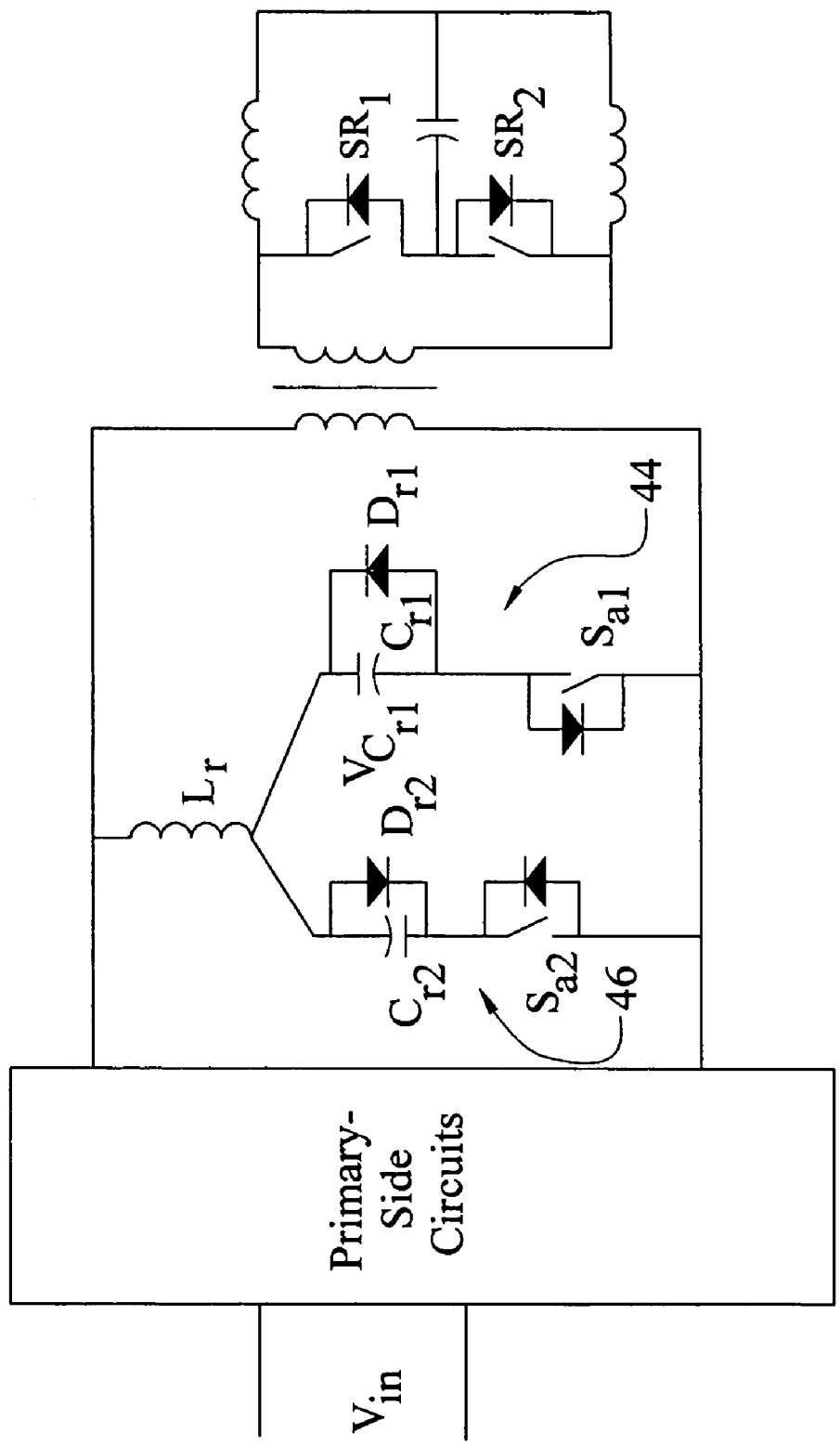
Figure 11A:
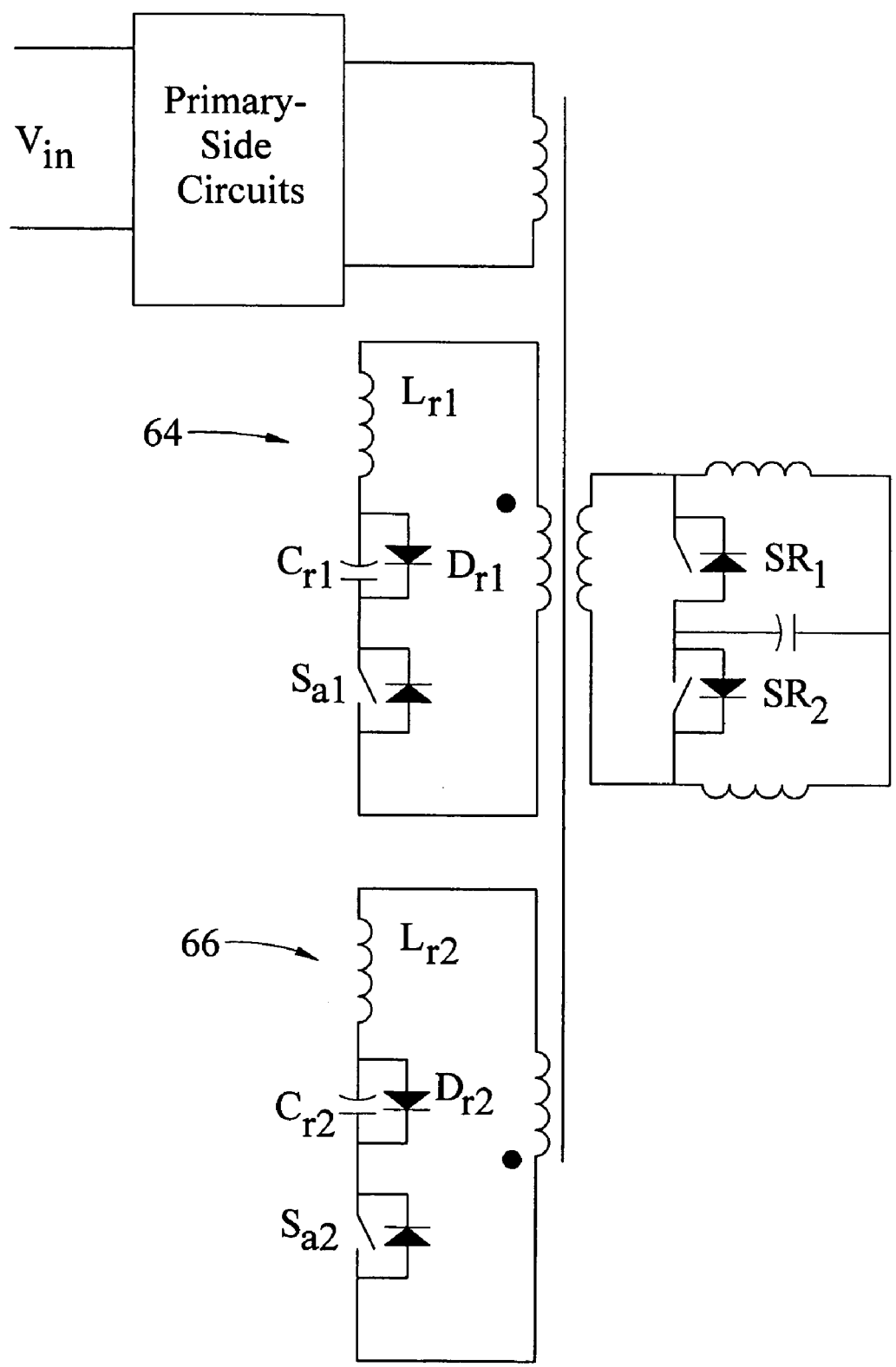
Figure 12:
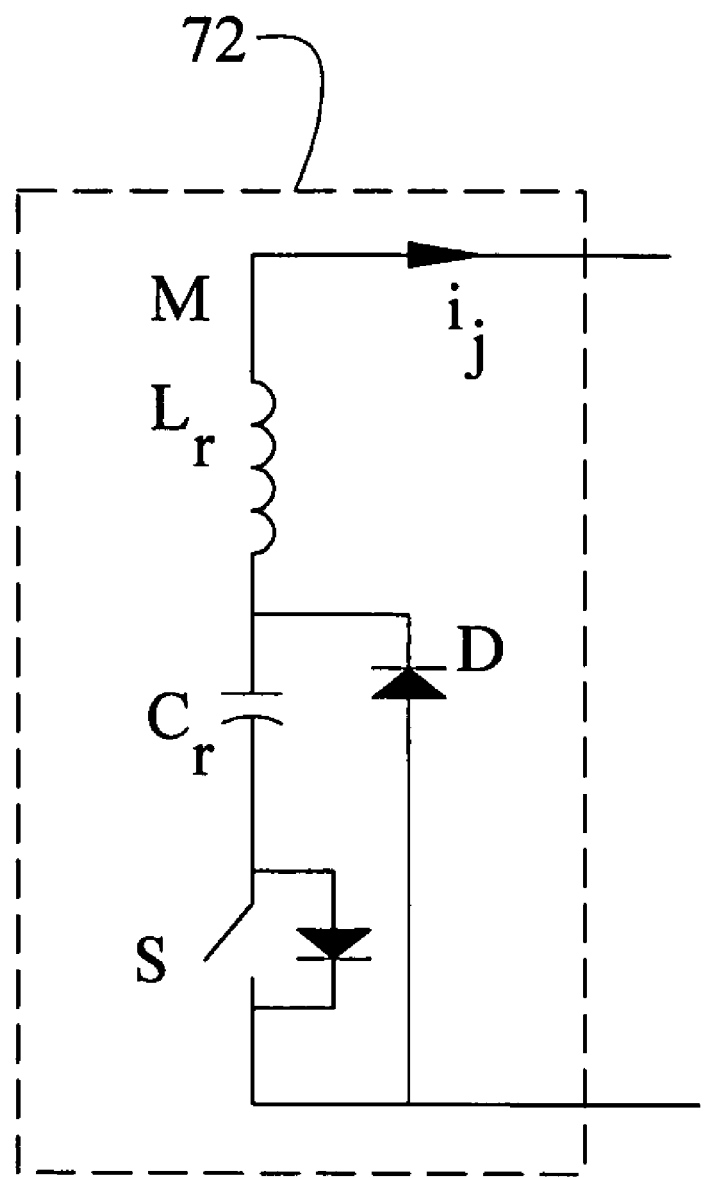

FIGS. 5a-f are non-isolated converters in accordance with the present disclosure;

FIG. 6 is a buck dc-dc converter in accordance with the present disclosure;

FIG. 7 is a timing diagram for the operation of FIG. 6;

FIGS. 8a-d are isolated dc-dc converters in accordance with the present disclosure;

FIGS. 9a and b are further embodiments of converters in accordance with the present disclosure;

FIGS. 10a-d are still further embodiments of converters in accordance with the present disclosure;

FIGS. 11a and b are still further embodiments of converters in accordance with the present invention; and FIG. 12 is a circuit diagram of an alternate embodiment of an active resonant cell in accordance with the present disclosure.

DETAILED DESCRIPTION

The following description is merely exemplary in nature and is not intended to limit the present disclosure, application, or uses.

In the active resonant tank (ART) cells of the present disclosure an SR's body diodes are not carrying current when the SR turns off, thus body diode conduction loss is saved, and reverse-recovery-related switching and ringing loss are eliminated. In one aspect of the disclosure, ART cells consist of a network including an LC resonant tank and an active switch. Basically, prior to the turn-on of a main switch, energy stored in the tank capacitor is transmitted through a resonant inductor to discharge the main switch's junction capacitance, such that the main switch turns on at ZVS. In a following interval, the ART cell is reloaded in a resonant manner. Since energy communication occurs only during a switch's switching transition, conduction loss dissipated in the resonant tank is limited. Moreover, the auxiliary active switch turns off at ZVS and the SRs operate at ZVS. The disclosed ART cells can be applied to both isolated and non-isolated dc-dc converters. Experimental results show that efficiency improvement is achieved due to reduced switching loss and the elimination of the body diode's conduction and reverse-recovery switching losses.

In one aspect of the disclosure a ZVS hybrid topology consists of an active resonant tank (ART) connected to a dc-dc converter with a synchronous rectifier (SR). Preferably, an ART cell is inserted into a conventional dc-dc converter to achieve ZVS for both the power switch and the SR. In one embodiment, an ART cell allows converters to utilize SRs for higher voltage applications because reverse recovery of body diodes is completely eliminated.

The disclosed ART cells may be placed in parallel with an SR to provide high-voltage synchronous rectification. Because the power switch operates at ZVS and the SR's converter body diode does not carry any current, reverse-recovery-related problems can be removed. Basically, the ART cell stores energy in a capacitor while the main switch is on. During a switching transition interval, the auxiliary switch is turned on, the ART cell is activated, and energy in the ART cell capacitor is transferred to an ART cell resonant inductor $L_r$. The load current is shifted to the ART cell and the current in the SR is reversed. When the SR is turned off, the resonant inductor current is released to discharge the switch's junction capacitance, and ZVS is achieved for the power switch. Since the ART cell is activated only during the switching transition time, the disclosed dc-dc converters are able to operate with minimum current stress and conduction loss in the ART cell is limited.

Figure 1C:
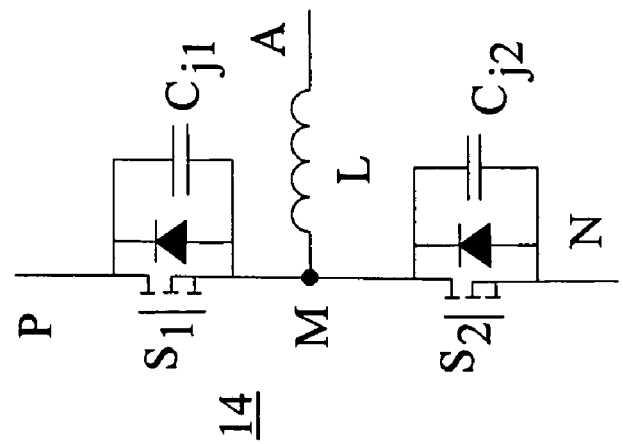
Figure 1B:
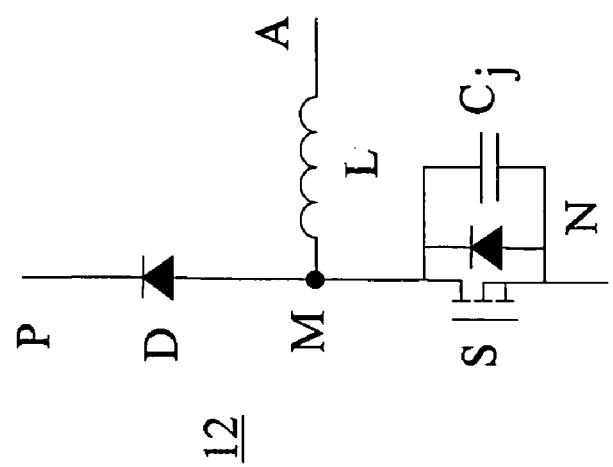
Figure 1A:
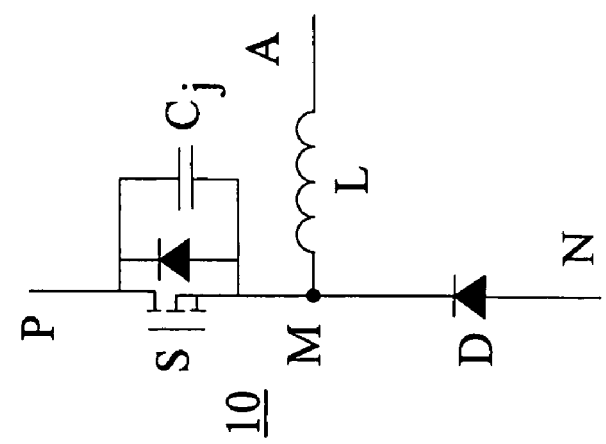

Buck, boost, and buck-boost dc-dc converters are common non-isolated dc-dc converters, though as described below the present disclosure is also applicable to isolated converters. Typically each converter includes a 3-terminal cell as shown in FIGS. 1a-c. FIG. 1a shows a cell 10 with a diode rectifier D for buck and buck-boost converters, and FIG. 1b shows a cell 12 for boost converters with a diode rectifier D.

Replacing the rectifier diode D with an SR in the three basic dc-dc converters, a common cell 14 is derived, as shown in FIG. 1c, where $C_{j1}$ and $C_{j2}$ represent a MOSFET's junction capacitance. For buck and buck-boost converters, MOSFET $S_1$ functions as an active switch and MOSFET $S_2$ functions as an SR switch; while in the boost converter, $S_1$ functions as an SR switch and $S_2$ functions as an active switch.

For a switching commutation in a conventional dc-dc converter with an SR, the active switch operates at hard switching, while the SR switch turns on at ZVS. A buck converter, in accordance with the present disclosure, is shown in FIG. 2, with an ART cell represented as a current injection cell, shown within dashed line 16.

First, consider operation of the buck converter without current injection cell 16. When switch $S_1$ turns off, inductor current charges junction capacitance $C_{j1}$ and discharges junction capacitance $C_{jSR}$ until a voltage across $C_{jSR}$ approaches zero. As a result, the body diode $D_{bSR}$ conducts current, and then SR turns on with ZVS and inductor current freewheels through SR. Freewheeling mode ends up with SR turning off and forcing inductor current to shift from the SR to body diode $D_{bSR}$. Then Switch $S_1$ turns on with the junction capacitance $C_{j1}$ discharging through $S_1$. Due to SR body diode $D_{bSR}$ reverse-recovery current, the active switch $S_1$ incurs turn on loss, and the body diode incurs hard turn-off loss. In short, in the buck converter of FIG. 2 without the current injection cell 16, active switch $S_1$ operates at an undesirable hard turn on condition, the SR operates at ZVS turn on, and the body diode's reverse recovery leads to undesirable switching loss and EMI problems. Because the reverse recovery characteristic of $D_{bSR}$ becomes worse as a MOSFET's voltage rating increases the use of SRs prior to the present disclosure have been limited to low voltage rectification applications.

From the switching operation of the buck converter described above, it is noted that the SR's turn-on and switch $S_1$'s turn-off are desirable, and the SR's turn-off and switch $S_1$'s turn-on are undesirable due to the reverse-recovery of the SR's body diode $D_{bSR}$. The desired switching operation is that all of the switches's body diodes conduct prior to turn-on, and all of the switches turn-off with an inductive load instead of a capacitive load. In other words, to avoid the body diode's hard turn-off, the current commutation sequence should be from a switch to a body diode instead of from a body diode to a switch.

Figure 2:
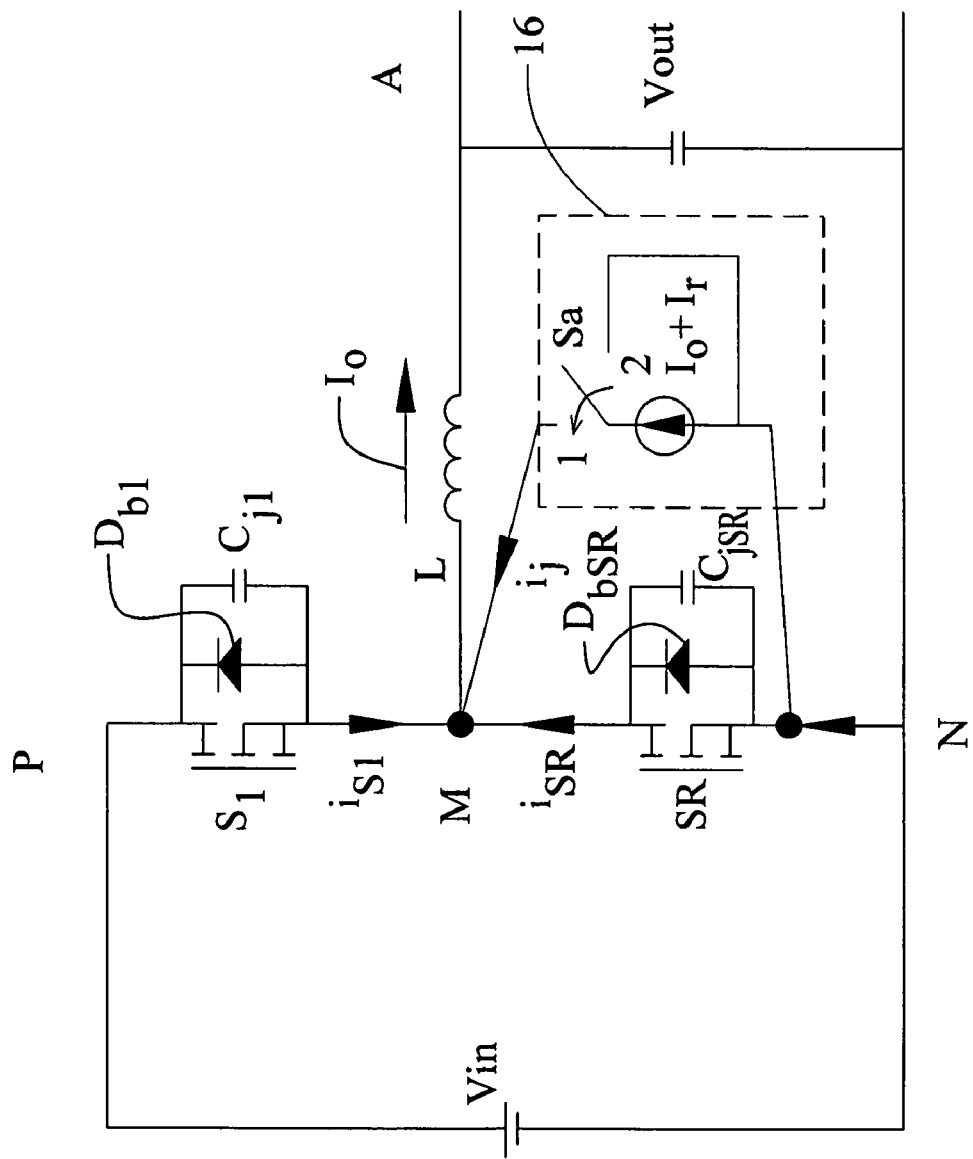
FIG. 2 shows a buck cell in accordance with the present disclosure.
Figure 3:
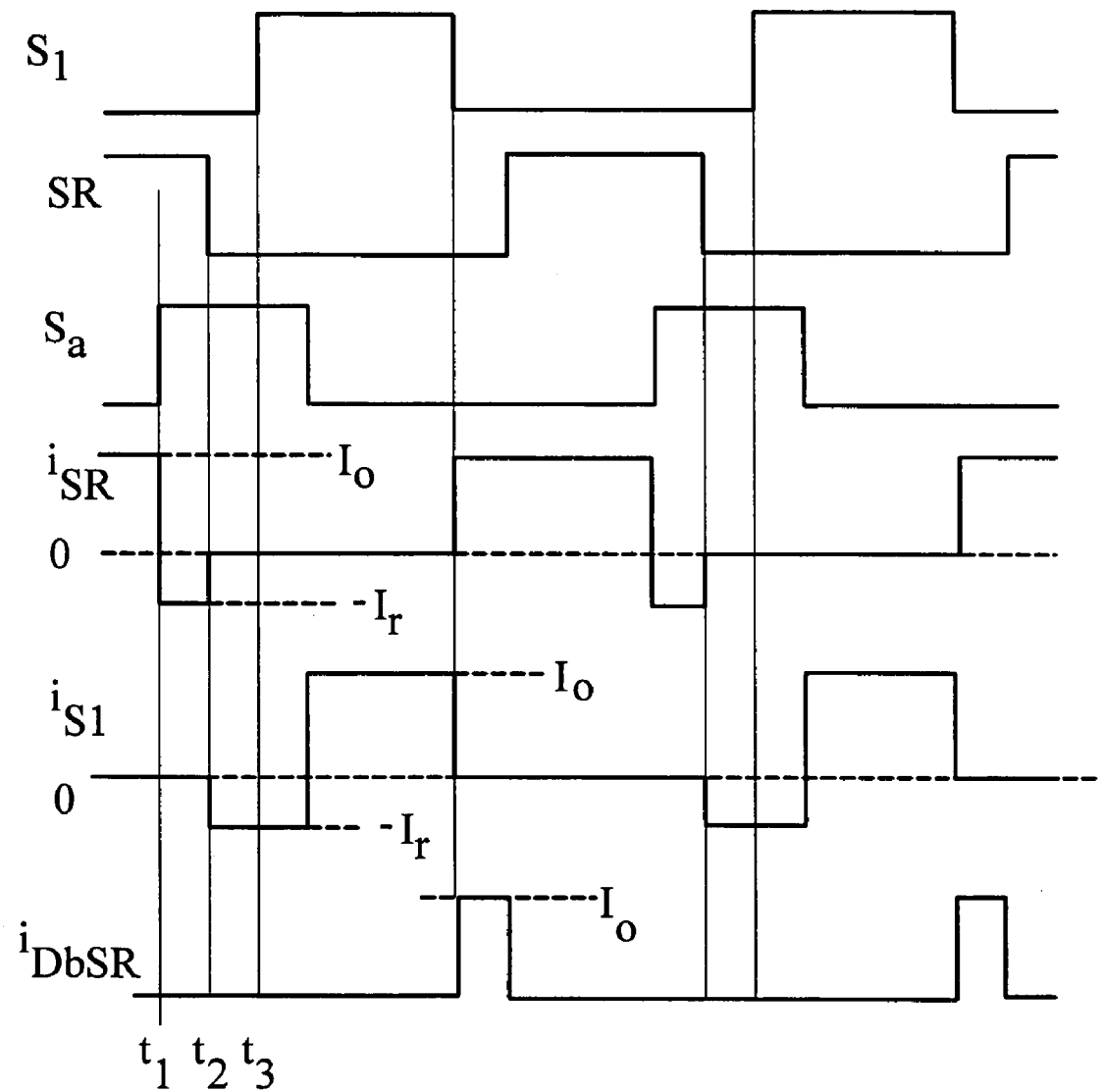
FIG. 3 is a timing diagram for the operation of FIG. 2.

As shown in FIG. 2, a current injection cell 16 is placed in parallel with the SR to enable the buck converter to achieve the desired switching commutation sequence. The associated key waveforms are shown in FIG. 3 and assume that the switches are ideal and the inductance current is constant. Switch Sa is turned "on" at Position "1" to inject current $I_r+I_o$ in the converter. The cell 16 ensures that SR turns off at an inductive load and that body diode $D_{bSR}$ is not involved during the turn-off interval. During the freewheeling mode while $t<t_1$, SR carries freewheeling current $i_{SR}(t)=I_o$. At $t=t_1$, the cell 16 is activated and a current is injected into the node M, where the equation $i_{SR}+i_j=I_o$ is satisfied, forcing SR current to be reversed with $i_{SR}(t_1)=-I_r$. At $t=t_2$, SR turns off and current $I_r$ charges the junction capacitance $C_{jSR}$ and discharges $C_{j1}$, and eventually the body diode $D_{b1}$ carries current $I_r$. At $t=t_3$, switch $S_1$ turns on at ZVS. At $t_1<t<t_3$, the SR body diode does not conduct; thus, the body-diode reverse-recovery-related loss is eliminated. In addition, the active switch $S_1$ achieves ZVS because of current injection cell 16. Therefore, both the SR and the active switch $S_1$ operate at ZVS conditions, and the converter operates at desirable conditions.

Figure 4:
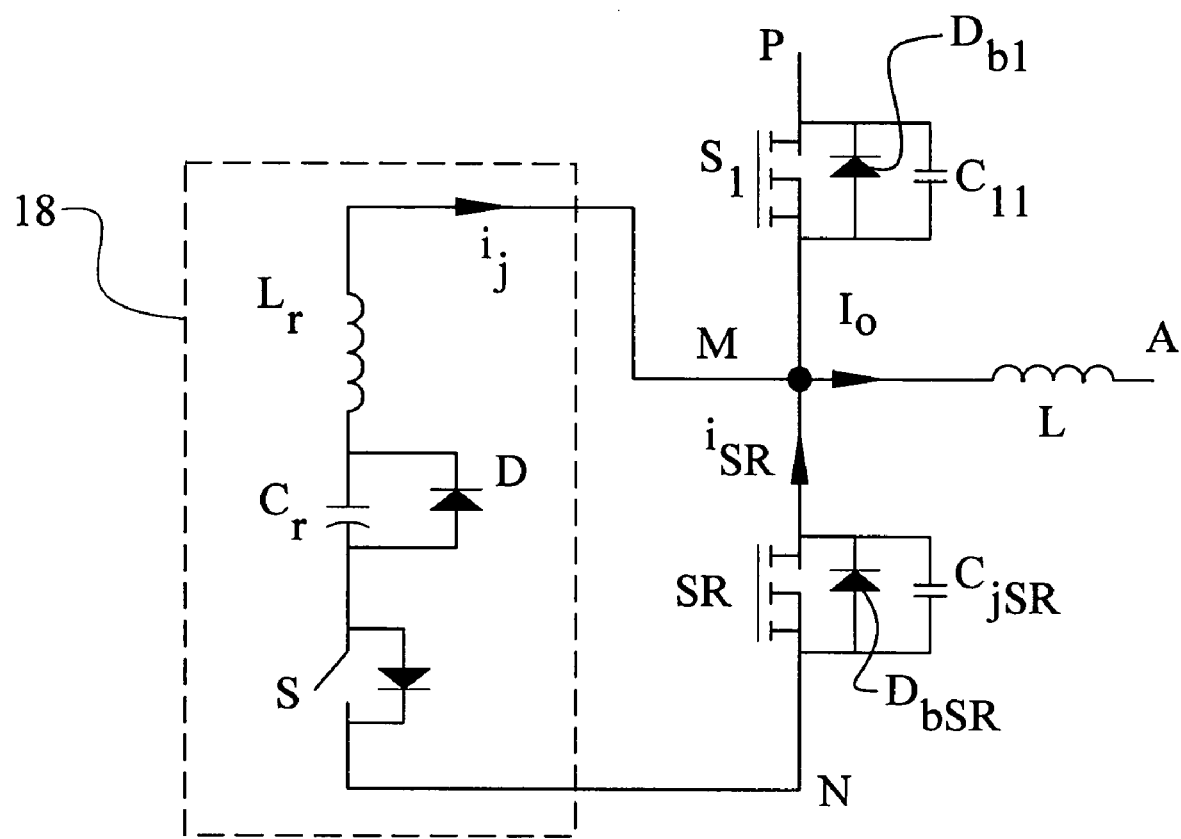
FIG. 4 is a dc-dc converter in accordance with the present disclosure.

FIG. 4 shows a circuit, in accordance with the present disclosure, and consists of an LC tank ($L_r$ and $C_r$) and an active switch S forming an ART cell 18. Assume the resonant capacitor $C_r$ is pre-charged to $2V_{PN}$ and SR is on to carry freewheeling current $I_o$. With the turn-on of the active switch S, the capacitor $C_r$ starts to charge the resonant inductor $L_r$ through the switch SR. Ignoring any power loss, the current in the resonant inductor $L_r$ is given by:

$$i_{Lr}(t) = \frac{2V_{PN}}{L_r\omega_o}\sin(\omega_o t) \quad \left(0 \le t \le \frac{\pi}{2\omega_o}\right) \quad (1)$$

The resonant capacitor voltage is given by:

$$v_{cr}(t) = 2V_{PN}\cos(\omega_o t) \quad \left(0 \le t \le \frac{\pi}{2\omega_o}\right) \quad (2)$$

where $\omega_o = \frac{1}{\sqrt{L_r C_r}}$, the resonance ends with resonant capacitor voltage reaches zero: $V_{Cr}=0$, and the resonant current reaches maximum as:

$$I_j = I_{Lr,max} = \frac{2V_{PN}}{Z_0} \quad (3)$$

where the circuit characteristic impedance, $Z_0$, defined as:

$$Z_0 = \sqrt{\frac{L_r}{C_r}} \quad (4)$$

After that, resonant inductor current freewheels through the diode D in ART cell 18. If the injected current is larger than an output current, $I_j>I_o$, the SR current is reversed during the freewheeling duration of the resonant inductor, $I_{SR}=I_o-I_j$. When, SR turns off, the additional inductor energy is utilized to charge the junction capacitance $C_{jSR}$ and discharge $C_{j1}$. If the following equation is satisfied:

$$\frac{1}{2}L_r(I_j - I_o)^2 \ge \frac{1}{2}(C_{jSR} + C_{j1})V_{PN}^2 \quad (5)$$

the body diode of switch $S_1$ conducts and switch $S_1$ turns on at ZVS. When switch $S_1$ turns on, node M is connected to a voltage source, the inductor current decreases to zero and becomes negative, then the resonant capacitor $C_r$ begins charging in a resonant manner. During the capacitor-charging period, the cell 18 switch S turns off at ZVS. The resonance ends when inductor current goes back to zero and the capacitor voltage reaches $2V_{PN}$. It is noted that the cell 18 switch S is activated only during a current commutation interval from the SR to $S_1$. It is also noted that switch S may be a P-channel MOSFET or an N-channel MOSFET.

ART cells are applied to common non-isolated dc-dc topologies as in FIGS. 5a-f. Considering the issues discussed above, each disclosed converter is based on the general concept of charging the resonant capacitor and pumping out its energy during the switch transition period by activating the auxiliary switch to eliminate the reverse recovery of the SR body diode and achieve ZVS. As those skilled in the art will appreciate, other topologies than those shown here may be used and still be in accord with the present disclosure.

Figure 5A:
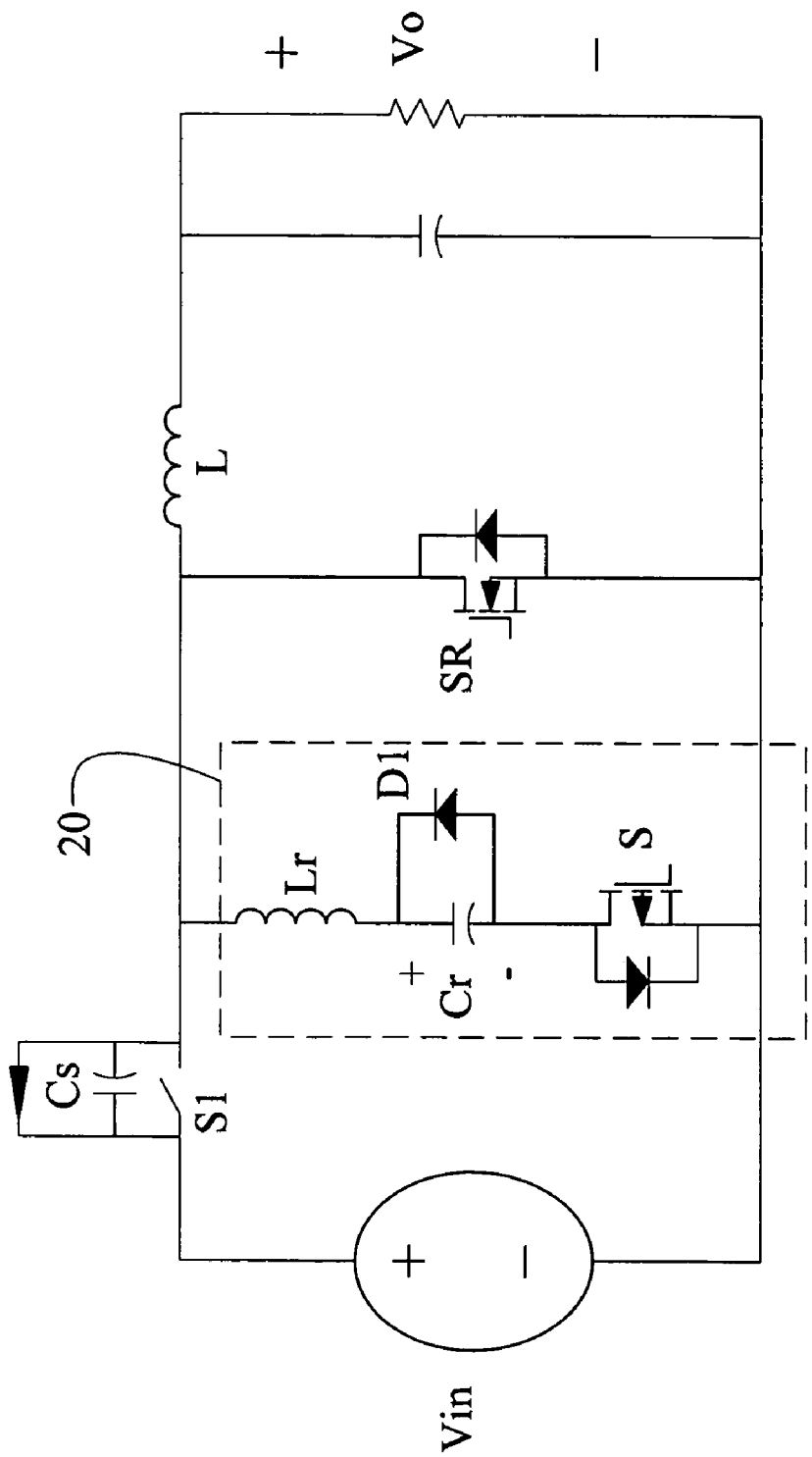
Figure 5B:
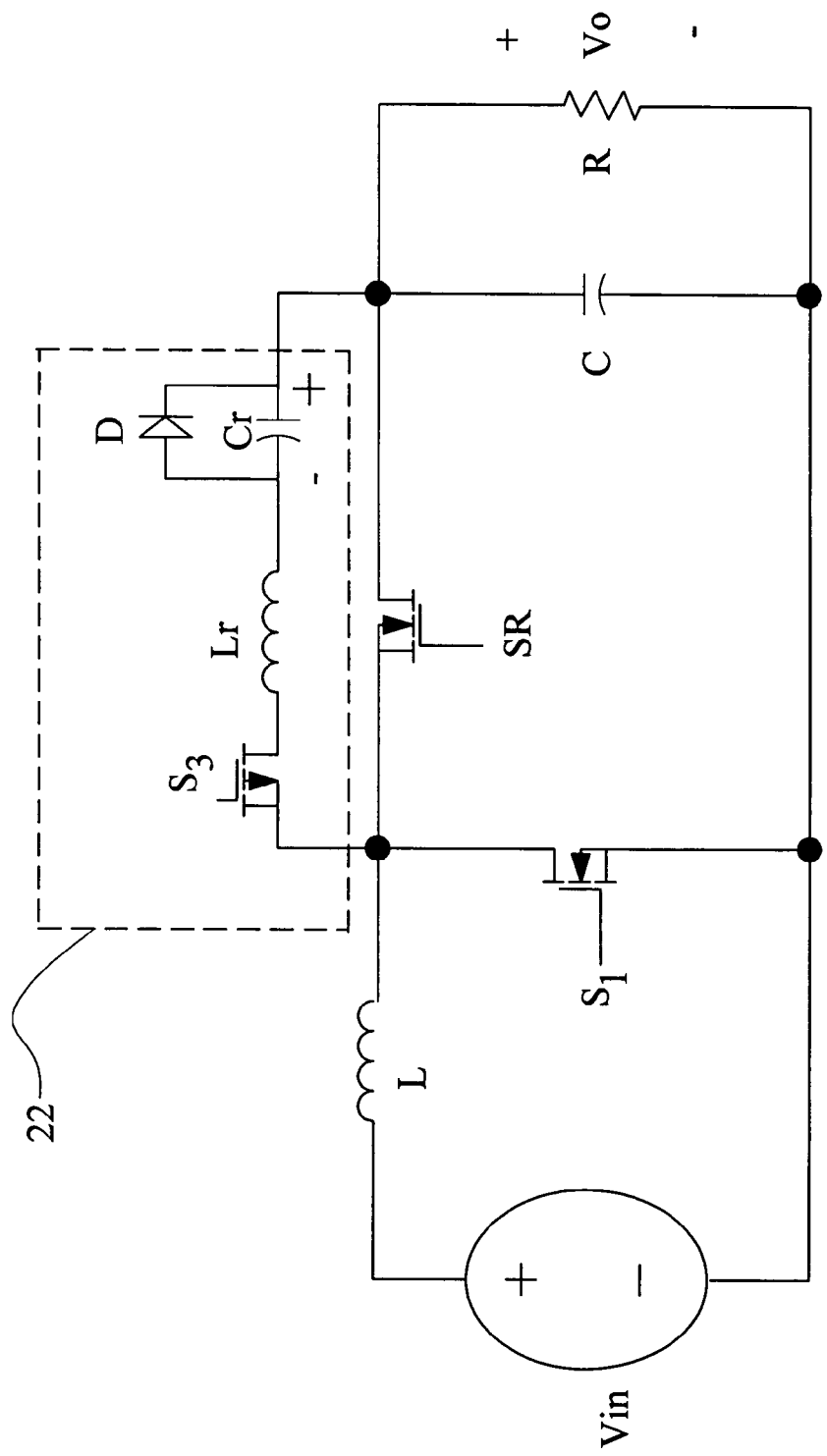
Figure 5C:
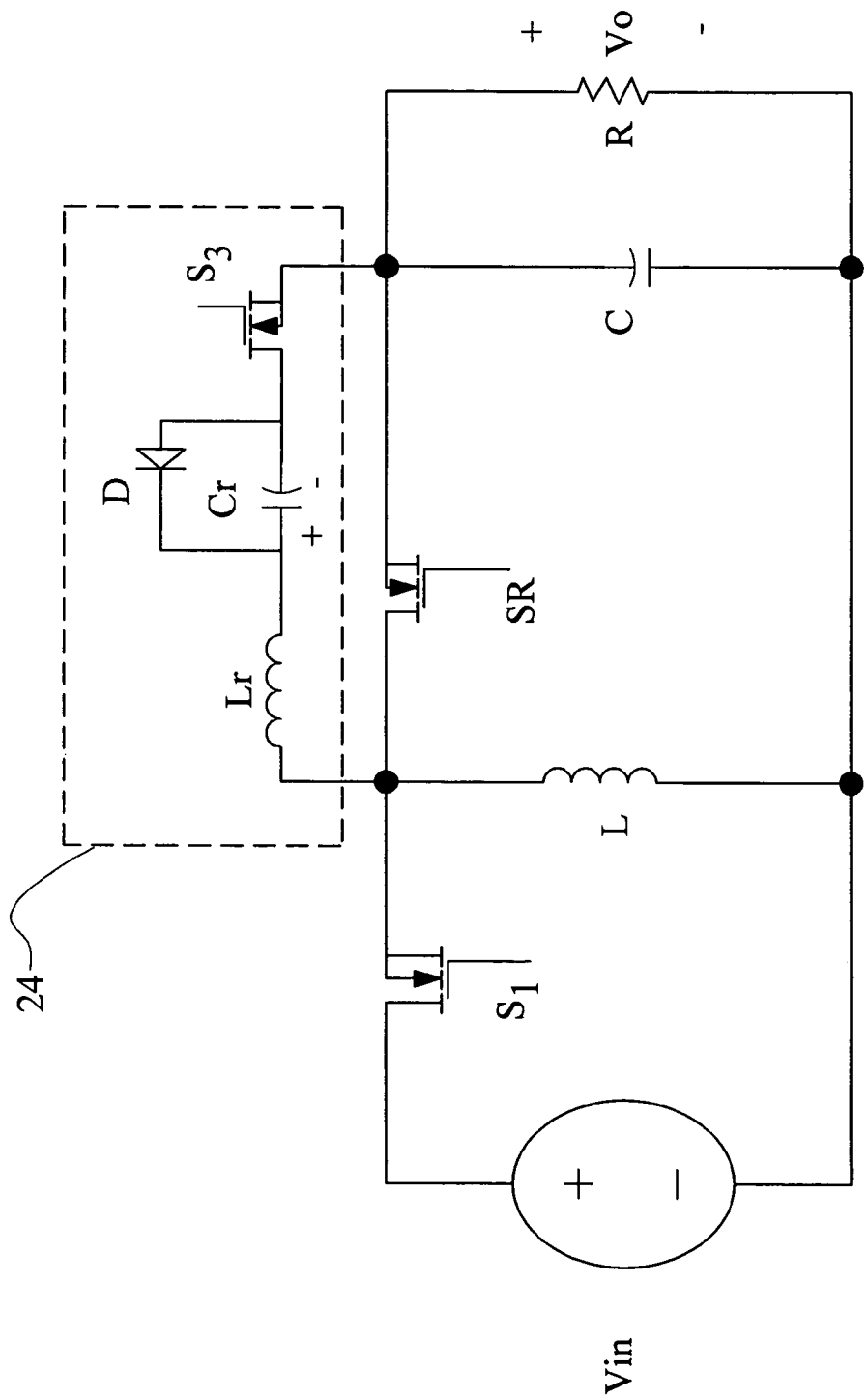
Figure 5D:
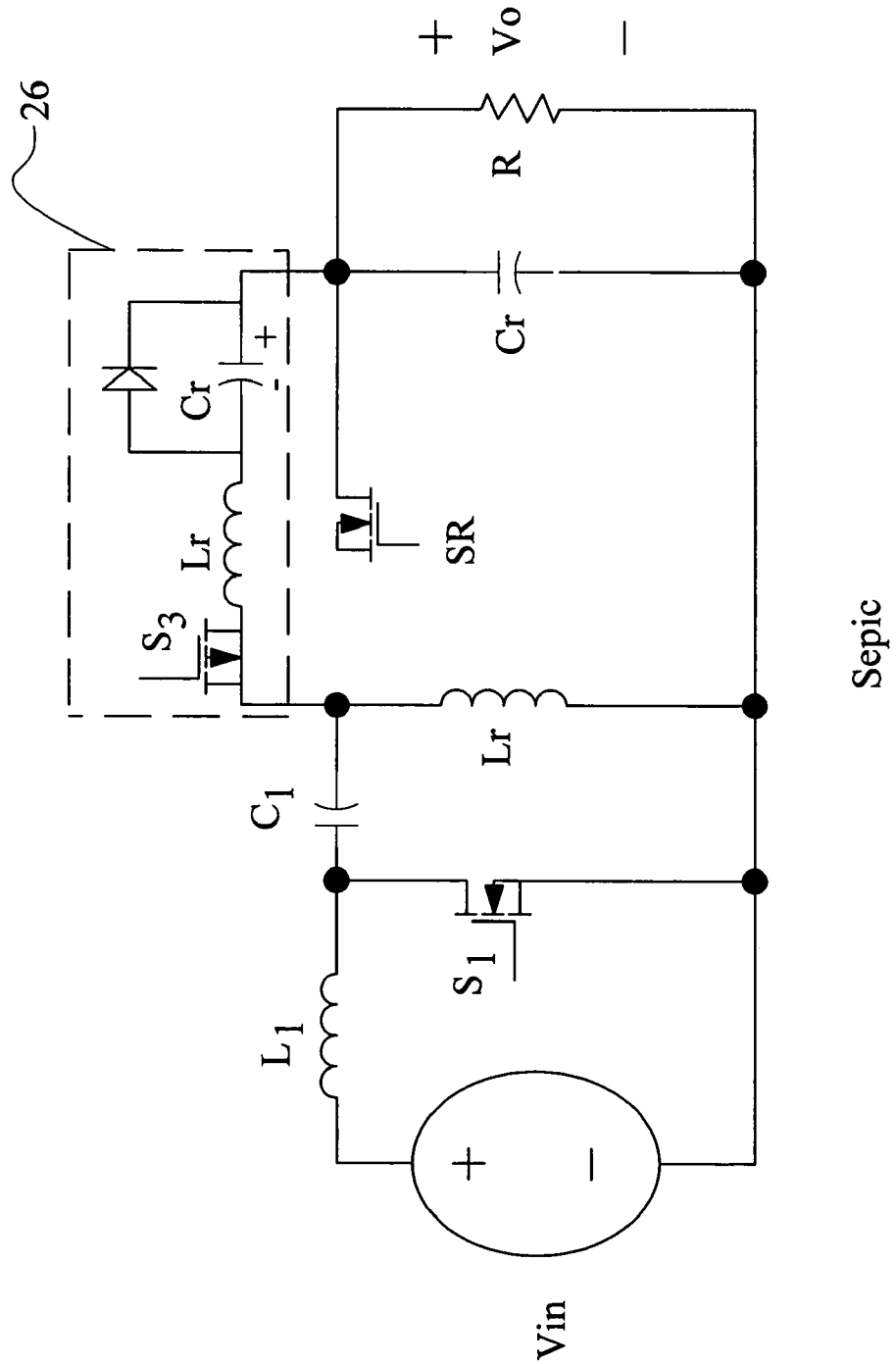
Figure 5E:
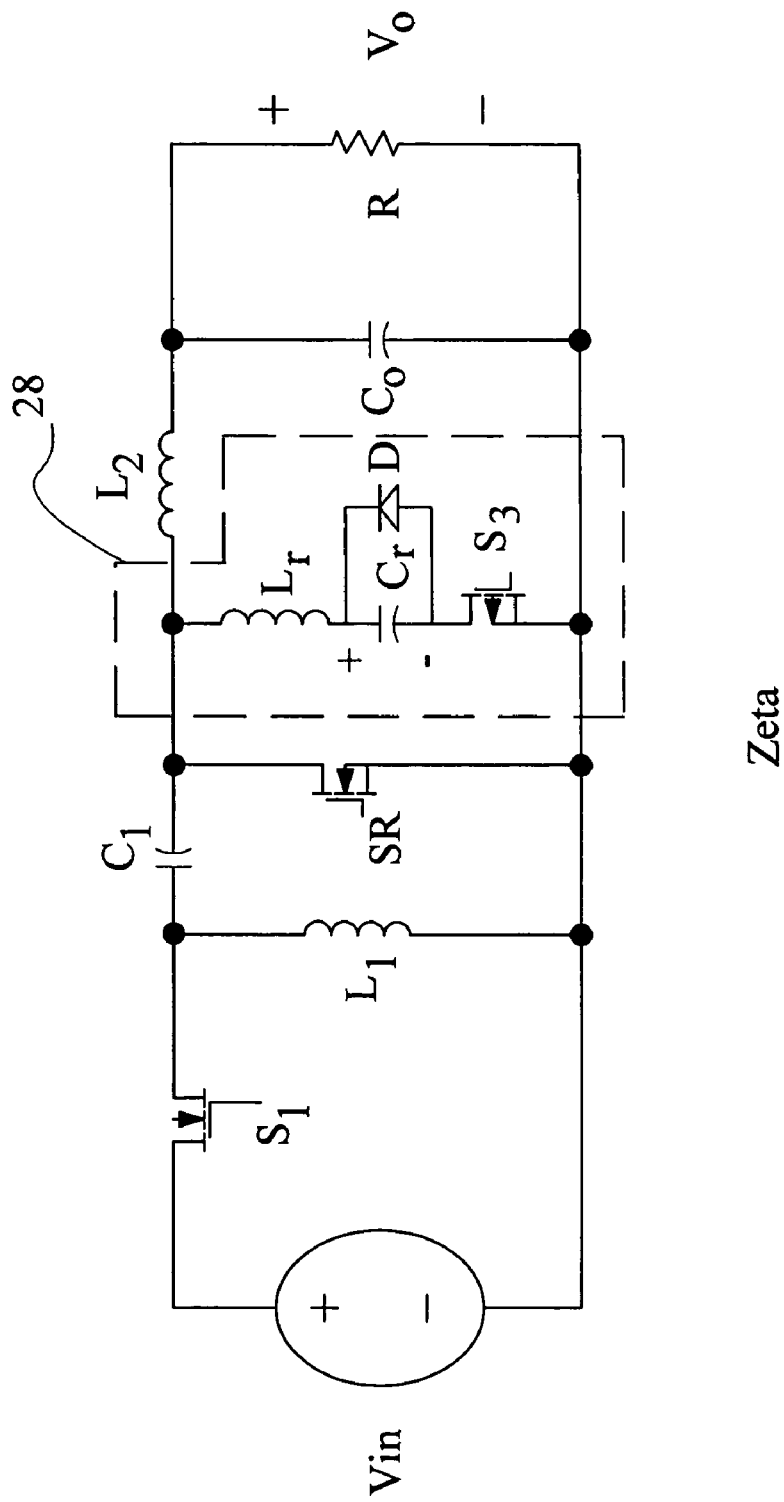
Figure 5F:
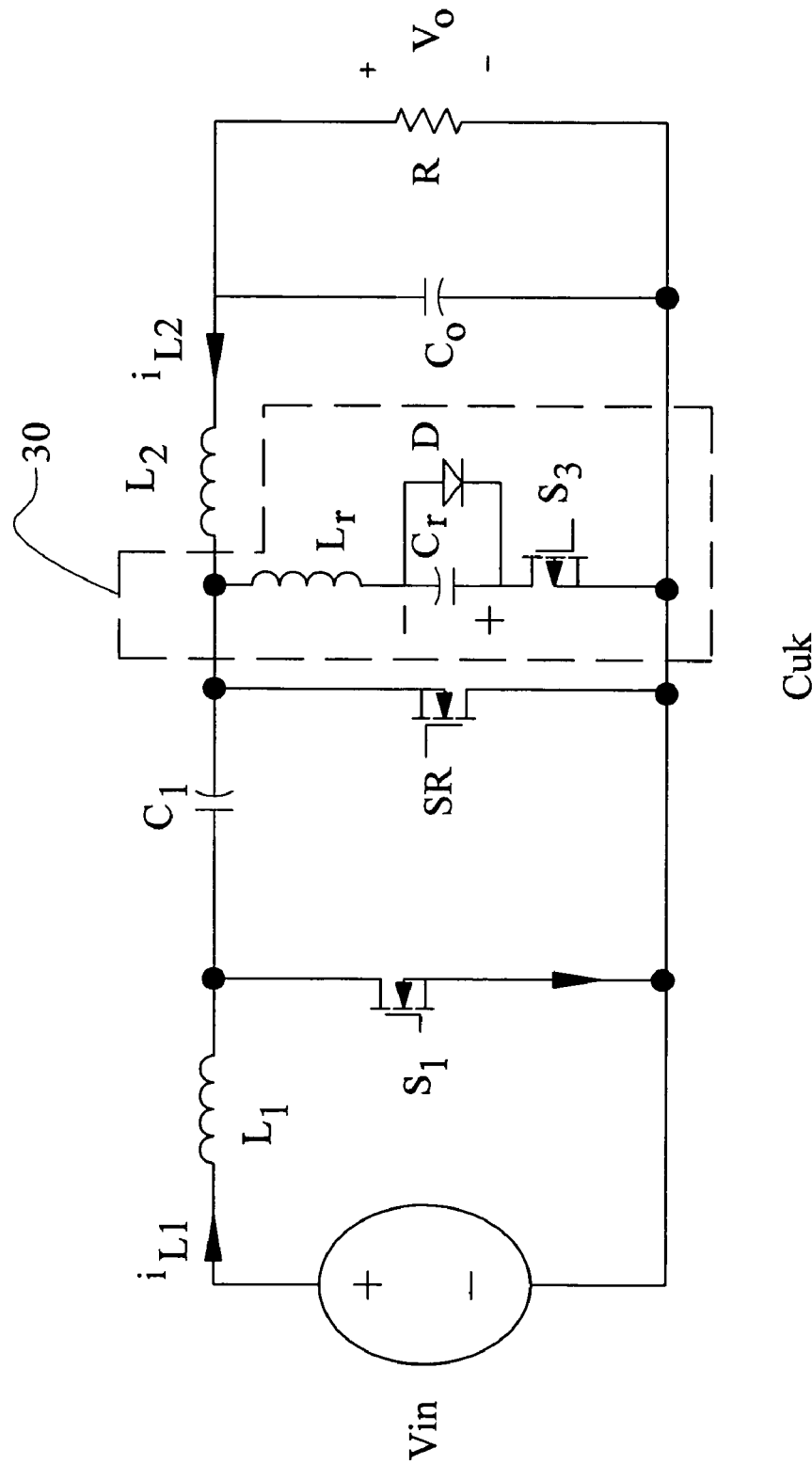

FIG. 5a is a buck converter with an ART cell 20, in accordance with the present disclosure. FIG. 5b is a boost converter with an ART cell 22, in accordance with the present disclosure. FIG. 5c is a buck-boost converter with an ART cell 24, in accordance with the present disclosure. FIG. 5d is a sepic converter with an ART cell 26, in accordance with the present disclosure. FIG. 5e is a zeta converter with an ART cell 28, in accordance with the present disclosure. FIG. 5f is a cuk converter with an ART cell 30, in accordance with the present disclosure.

By understanding this concept, those skilled in the art will appreciate the disclosure can be applied to isolated dc-dc topologies such as forward, flyback, half-bridge, full-bridge, push-pull, and other dc-dc converters.

A buck converter 32 with an ART cell 34 and synchronous rectification is shown in FIG. 6. FIG. 6 shows a dc-dc converter 32 including an inductor L, a synchronous rectifier SR connected to the inductor, and an active switch $S_1$ connected to the inductor and the SR. An active resonant tank (ART) cell 34 is connected to the SR in parallel such that a resonant capacitor $C_r$ of the ART cell 34 is charged so that during a switch $S_1$ transition period energy is pumped out of the resonant capacitor by activating the ART cell 34 to eliminate reverse recovery switching loss and achieve Zero Voltage Switching (ZVS). Corresponding key waveforms of converter 32 are shown in FIG. 7. The ART cell 34 includes the resonant elements inductor $L_r$, capacitor $C_r$, and an active switch S. S is preferably a P-channel MOSFET to simplify the drive. Diode D in ART cell 34 is for the freewheeling of resonant inductor current when the energy in the capacitor $C_r$ is transferred to $L_r$. The switch S P-channel MOSFET requires a negative gate driving voltage.

Assume all switches and diodes are ideal except if otherwise indicated. The output filter inductance L is assumed sufficiently large and the inductor current is assumed constant and equal to load current. The common modes of operation are described below.

The first mode is where $t_0 < t < t_1$. The resonant capacitor $C_r$ is pre-charged with $v_{C_r}(t_0) = 2V_{in}$, and the filter inductor L freewheels through SR. This mode starts with the turn-on of switch S at $t=t_0$, where the inductor current $i_{L_r}(t_0)=0$. $C_r$ charges $L_r$ in a resonant manner and the associated voltage and current are given by:

$$i_{Lr}(t) = \frac{2Vin}{L_r \omega_o} \sin\omega_o t \quad \left(0 \leq t \leq \frac{\pi}{2\omega_o}\right) \tag{6}$$

$$v_{Cr}(t) = 2Vin \cos\omega_o t \quad \left(0 \leq t \leq \frac{\pi}{2\omega_o}\right) \tag{7}$$

where $\omega_o = \frac{1}{\sqrt{L_r C_r}}$.

The mode ends at $$t = t_1 = \frac{\pi}{2\omega_o}$$

with the capacitor voltage discharged to zero, and the resonant current reaching maximum value:

$$i_{Lr}(t_1) = \frac{2Vin}{\omega_o L_r} \tag{8}$$

The second mode is where $t_1 < t < t_2$. With the resonant capacitor $C_r$ voltage reaching zero, the diode D in the cell 34 carries current, and the inductor $L_r$ is trapped in a short-circuit loop. Assuming the inductor current value $i_{Lr}(t_0) > I_o$, the SR current is reversed with a value of $(i_{Lr}(t_1) - I_o)$. Inductor L freewheels through ART cell 34 during this second mode.

The third mode is where $t_2 < t < t_3$. SR turns off at $t=t_2$, the inductor current previously flowing through SR charges the junction capacitance $C_{jSR}$ and discharges $C_{j1}$ until switch $S_1$ body diode $D_{bS1}$ conducts in the fourth mode.

The fourth mode is where $t_3 < t < t_4$. At $t=t_3$, capacitor $C_{j1}$ is discharged to zero, and the body diode of $S_1$ conducts current. During the fourth mode, through the body diode of the switch $S_1$, the resonant inductor current $i_{Lr}$ resets towards a steady-state value of $I_o$.

$$\frac{di_{Lr}(t)}{dt} = \frac{V_{in}}{L_r} \quad (t_3 < t < t_4) \tag{12}$$

The fifth mode is where $t_4 < t < t_5$. At $t=t_4$, switch $S_1$ turns on at ZVS. The resonant inductor current continues to decrease with the slew rate of Equation (12). When the resonant inductor current decreases to output filter inductor current $I_o$, the current in switch $S_1$ reverses direction and becomes positive.

After that, the $S_1$ current keeps increasing and the resonant inductor current decreases with the same slew rate as in Equation (12).

The sixth mode is where $t_5 < t < t_6$. When the switch $S_1$ current increases to the filter inductor current $I_o$, the resonant inductor current reverses direction and becomes negative, then diode D is blocked and the resonant capacitor $C_r$ is in resonance. ART cell 34 is charged in a resonant manner, and the resonant inductor current is given by:

$$i_{Lr}(t) = \frac{-V_{in}}{\omega_o L_r} \sin\omega_o(t - t_5) \quad t_5 \leq t \leq t_5 + \frac{\pi}{\omega_o} \tag{13}$$

The resonant capacitor voltage is given by:

$$v_{Cr}(t) = V_{in}(1 - \cos\omega_0(t - t_5)) \tag{14}$$

$$t_5 \leq t \leq t_5 + \frac{\pi}{\omega_0}$$

where $\omega_0 = \frac{1}{\sqrt{L_r C_r}}$.

The seventh mode is where $t_6 < t < t_7$. ART cell 34 switch S turns off at ZVS and the carried resonant current shifts to body diode $D_{bS}$ and the resonance continues as described in Equations (13) and (14) in the sixth mode. The sinusoidal resonant current rises to a peak and then decreases towards zero. The resonance ceases when the capacitor voltage reaches the peak ($V_{Cr}(t_7)=2V_{in}$) and the inductor current reaches zero ($i_r(t_7)=0$). The total duration of time in the sixth and seventh modes is determined by the ART cell 34's parameter:

$$\Delta t = t_7 - t_5 = \pi \sqrt{L_r C_r} \tag{15}$$

The eighth mode is where $t_7 < t < t_8$. After $t_7$, ART cell 34 is inactive and does not affect the converter. In this mode, the output filter is charged and the input power is delivered to the output.

The ninth mode is where $t_8 < t < t_9$. At $t=t_8$, switch $S_1$ turns off, the filter inductor charges the junction capacitance $C_{j1}$ and discharges $C_{jSR}$.

The tenth mode is where $t_9 < t < t_{10}$. When the junction capacitance voltage reaches zero, the SR body diode conducts the output inductor current, which provide a ZVS turn-on condition for the SR.

The eleventh mode is where $t_{10} < t < t_0 + T$. During the body-diode conduction interval, the SR turns on at ZVS, and the converter enters into inductor freewheeling mode. With the turn-on of the switch S, the converter goes back to the first mode.

Figure 8A:
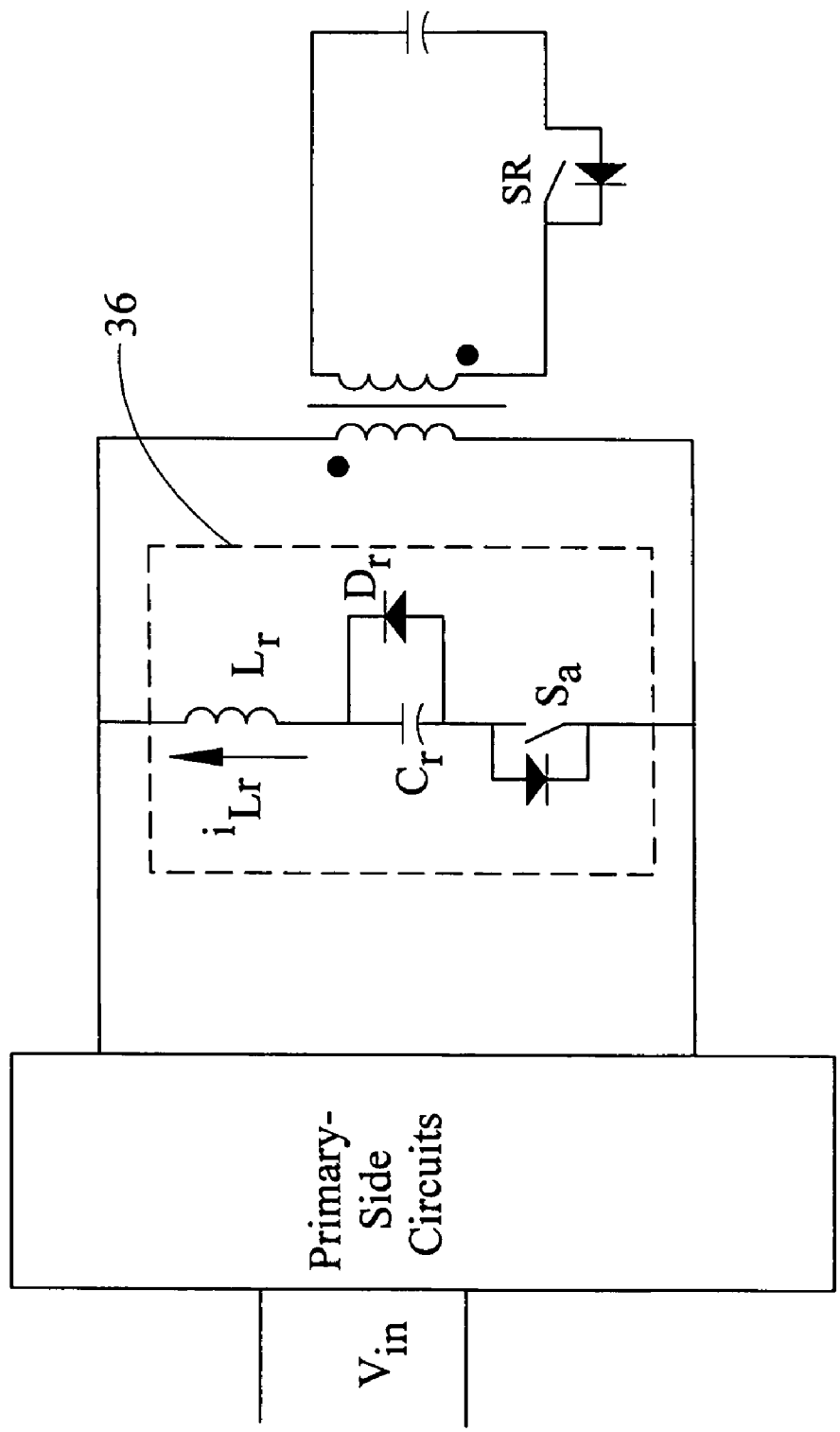
Figure 8B:
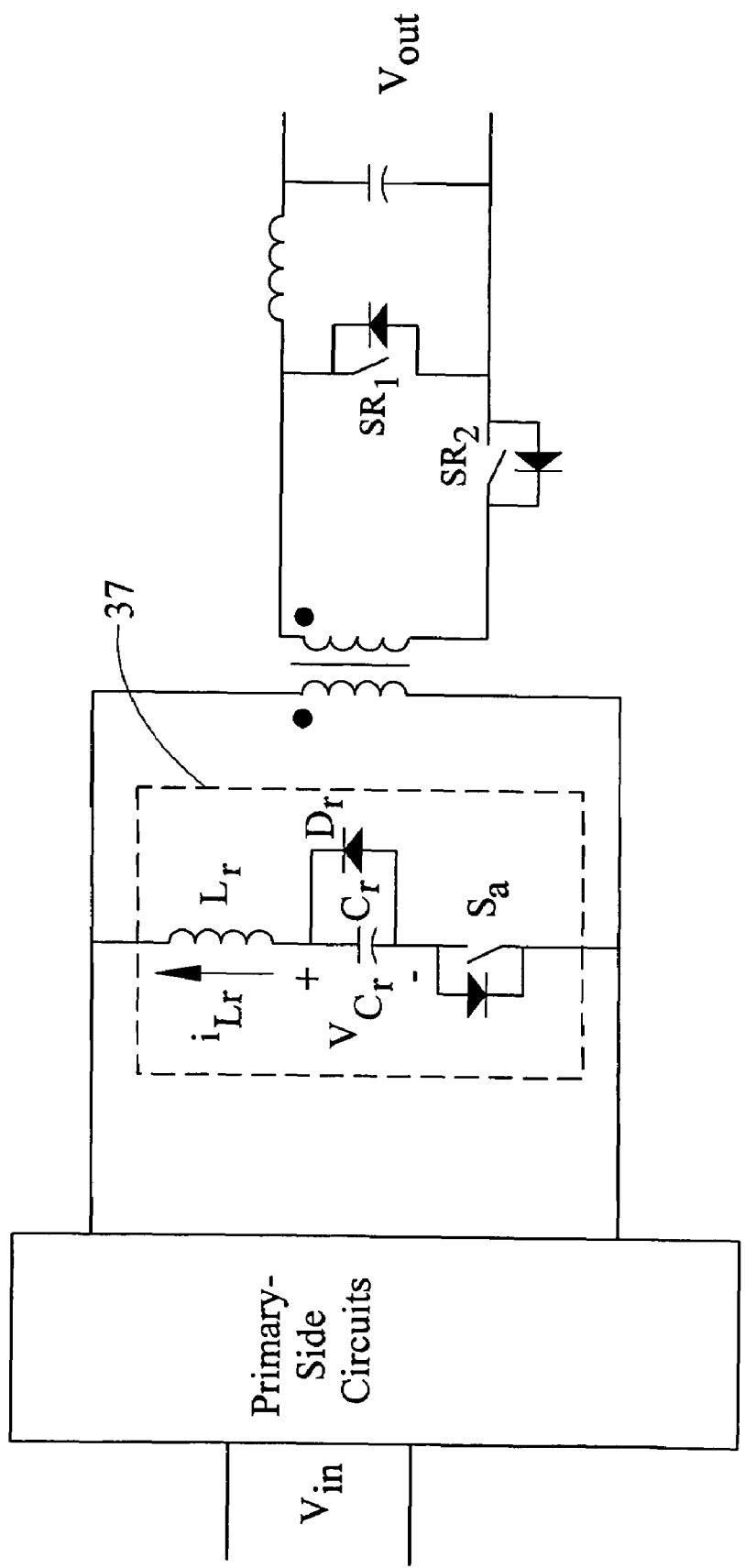

In isolated dc-dc converters, ART cells may be connected in parallel with SRs, in a similar fashion to that described above with regard to non-isolated converters. In another aspect of the disclosure, ART cells can be located on the converter primary side in parallel with a transformer primary winding, as shown in FIGS. 8a-d. For a step-down dc-dc converter, this connection is advantageous since primary side current stress is less than the secondary side's. For single-ended dc-dc converters, only an ART cell 36 is needed, as shown in FIGS. 8a and b. FIG. 8b shows an ART cell 37 used with a forward-type rectifier.

Figure 8C:
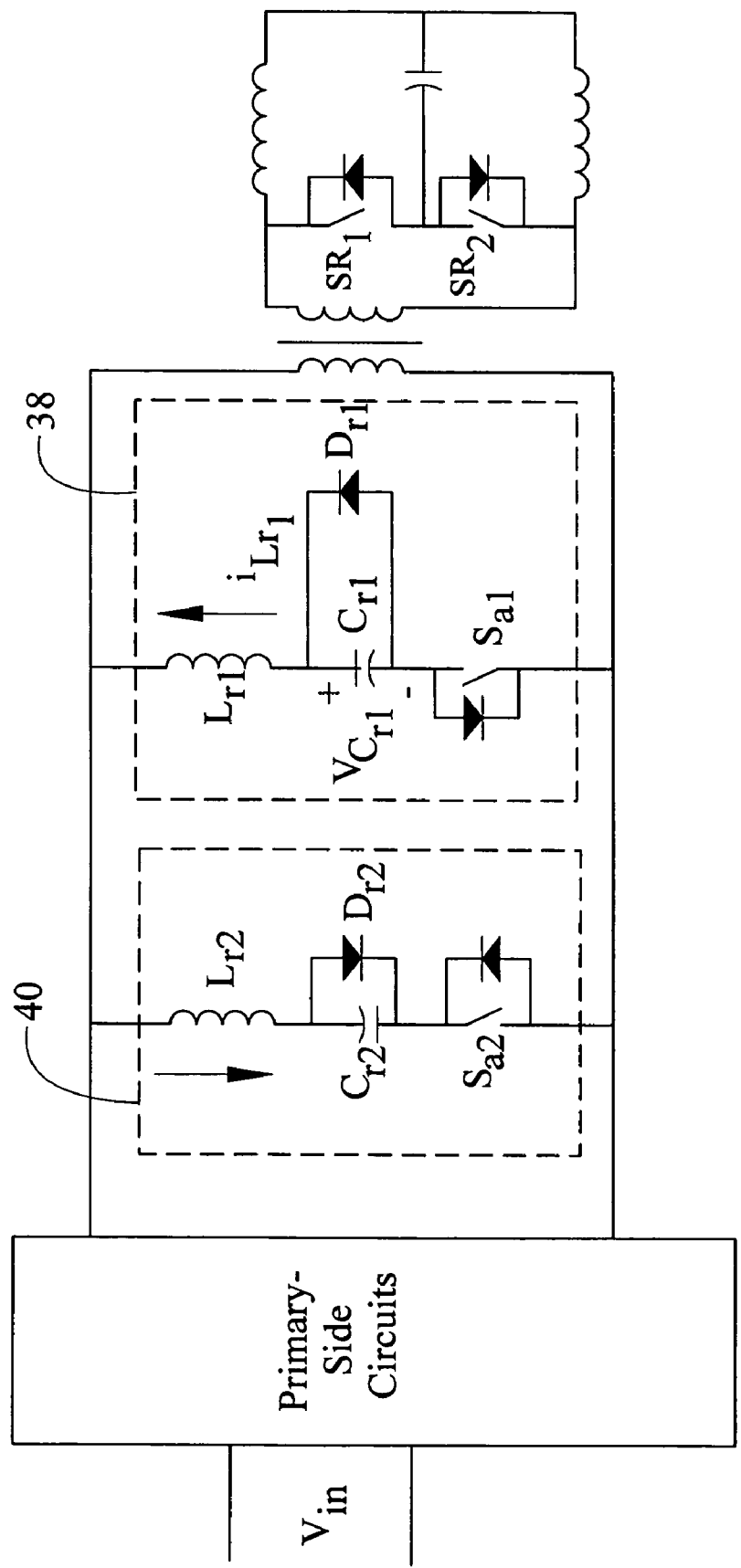
Figure 8D:
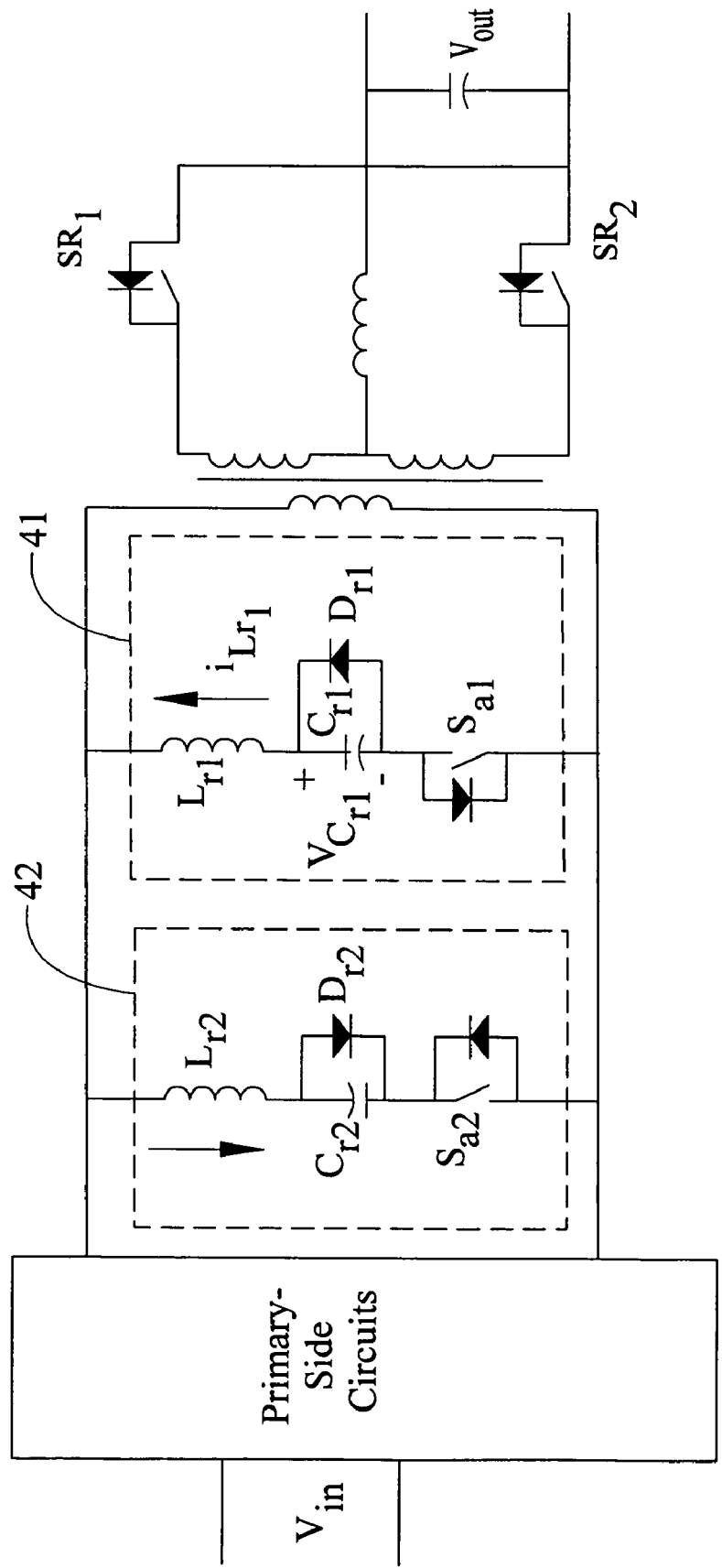

For double-ended converters, two ART cells 38 and 40 may be needed as shown in FIGS. 8c and d. In FIG. 8c, the converter is shown with a current doubler rectifier. FIG. 8d shows ART cells 41 and 42, in a converter with a center-tapped rectifier.

An active resonant tank cell 36, in FIG. 8a, is connected to the transformer primary side in parallel such that a resonant capacitor $C_r$ of the active resonant tank cell 36 is charged through the active switch and discharged through the synchronous rectifier. During a switch transition period energy is pumped out of the resonant capacitor by activating the ART cell 36 to eliminate reverse recovery switching loss and achieve zero voltage switching. FIGS. 8b-d works in a similar manner to FIG. 8a and includes first and second synchronous rectifiers $SR_1$ and $SR_2$. FIGS. 8b, c, and d show a dc-dc converter with a transformer having a primary winding and a secondary winding. At least one synchronous rectifier or, depending on the application, two synchronous rectifiers $SR_1$ and $SR_2$ are connected to the secondary winding. All the dc-dc converters referred to in this specification include a primary-side circuit, an isolation transformer, and a secondary synchronous rectifier. The ART cells are connected with the transformer primary winding to eliminate body-diode conduction loss and reverse recovery of the secondary synchronous rectifiers. In addition, the ART cells connected to the primary-side circuit allow ZVS to be achieved.

Figure 9B:
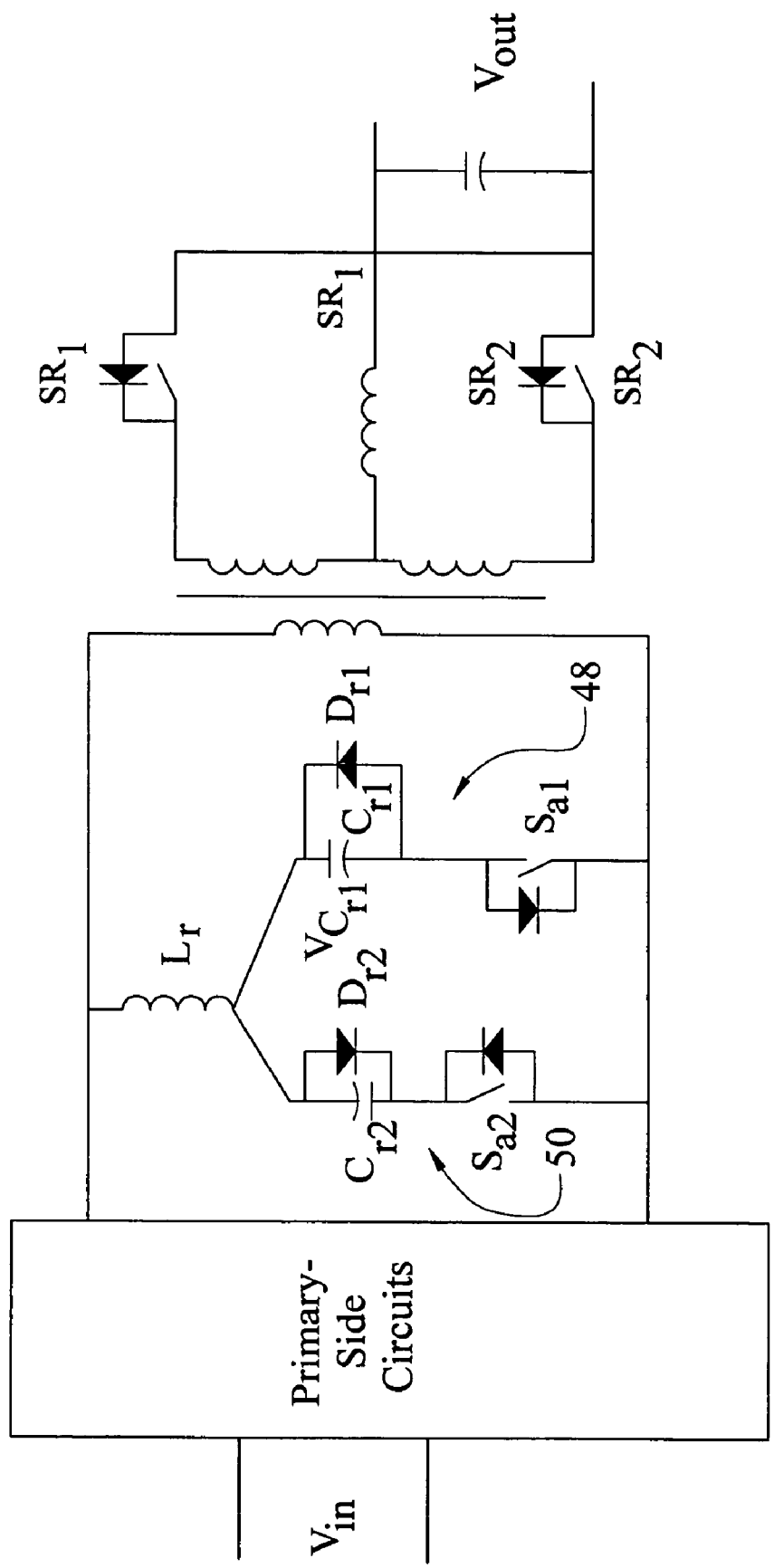

ART cells may be connected as shown in FIGS. 9a and b, which are simplified circuits of FIGS. 8c and d. FIG. 9a shows two ART cells 44 and 46 and FIG. 9b shows two ART cells 48 and 50 connected to a coupled winding via a single inductor Lr. These simplified circuits eliminate one inductor from FIGS. 8c and d and otherwise operate as described above with respect to FIGS. 8c and d.

Figure 10A:
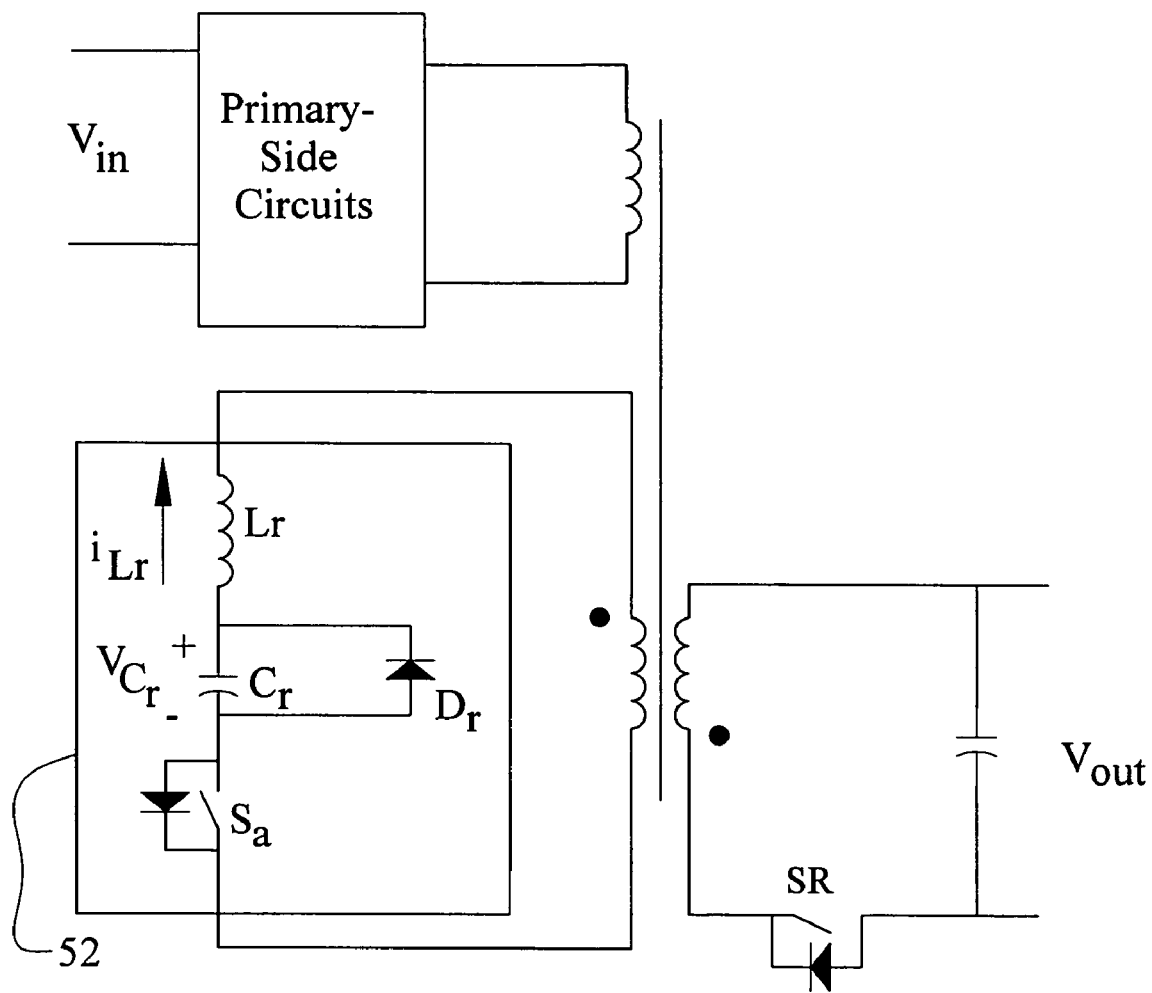

FIGS. 10a-d each show ART cells connected in parallel with additional windings. FIG. 10a shows an ART cell 52 connected in parallel with an additional winding having the primary-side circuits attached, as shown. FIG. 10a is a dc-dc converter with a flyback rectifier, similar to FIG. 8a.

Figure 10B:
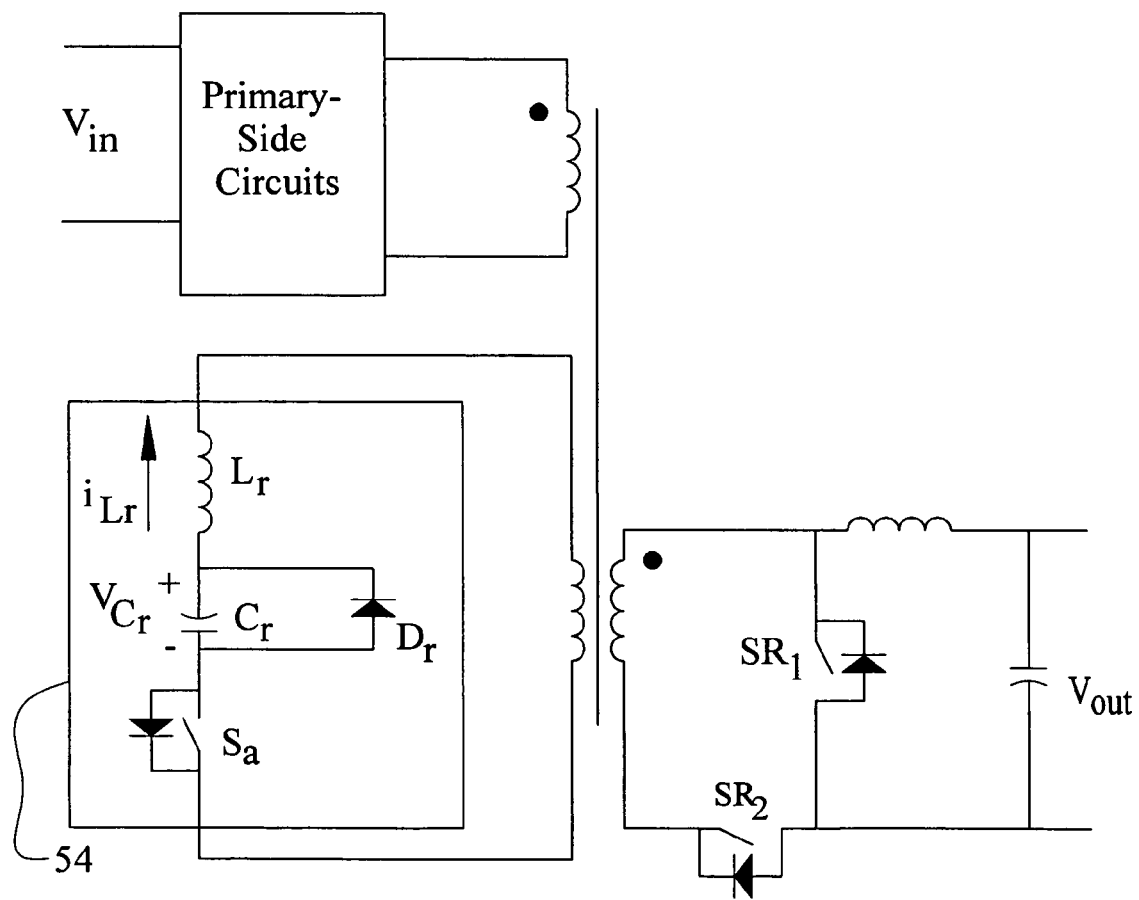

FIG. 10b includes an ART cell 54 in parallel with an additional winding, having the primary-side circuits, as shown. FIG. 10b is a dc-dc converter with a forward-type rectifier, similar to FIG. 8b.

Figure 10C:
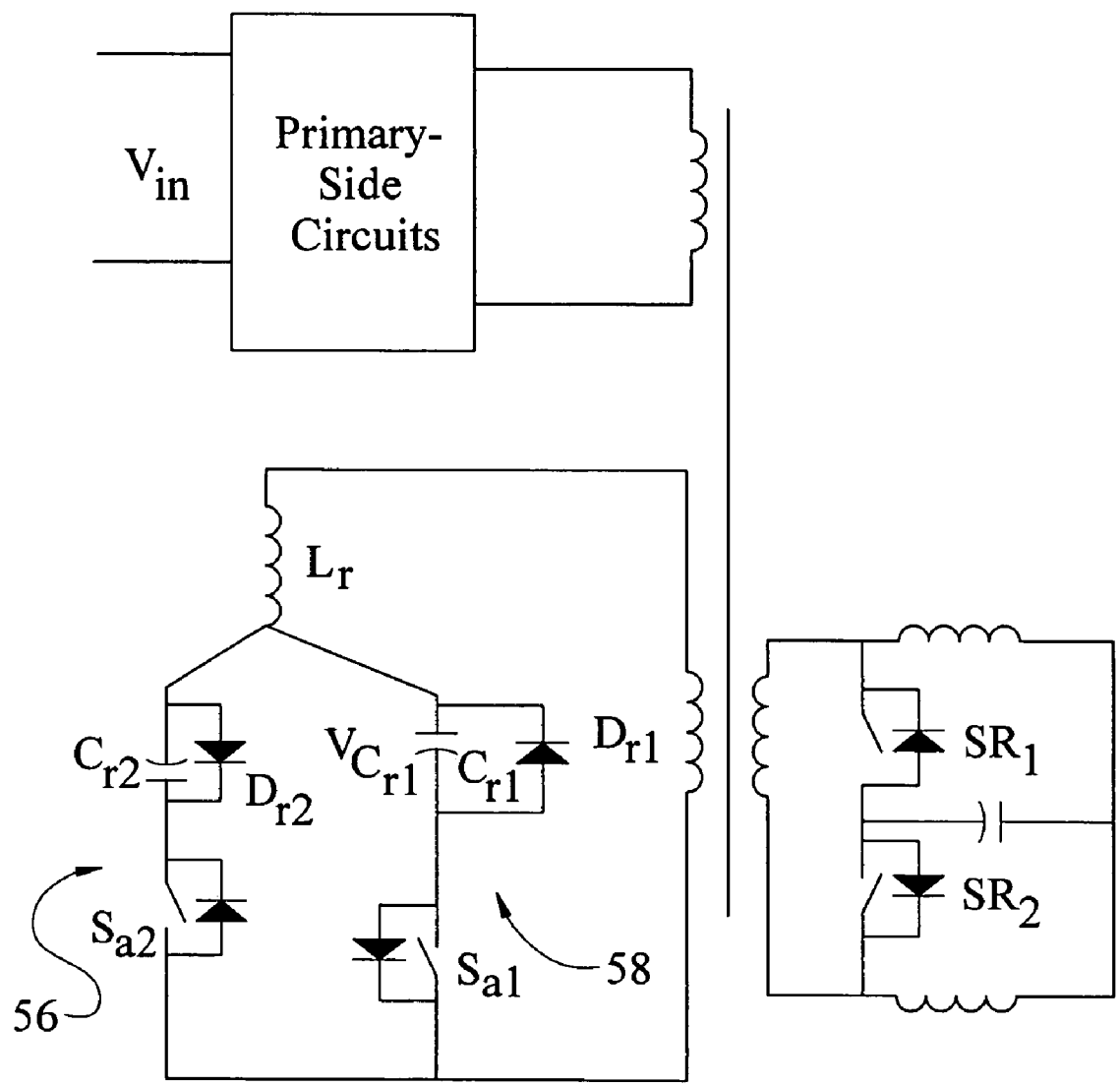

FIG. 10c shows simplified ART cells 56 and 58 in parallel with an additional winding. FIG. 10c is a dc-dc converter with a current doubler rectifier, similar to FIG. 9a.

Figure 10D:
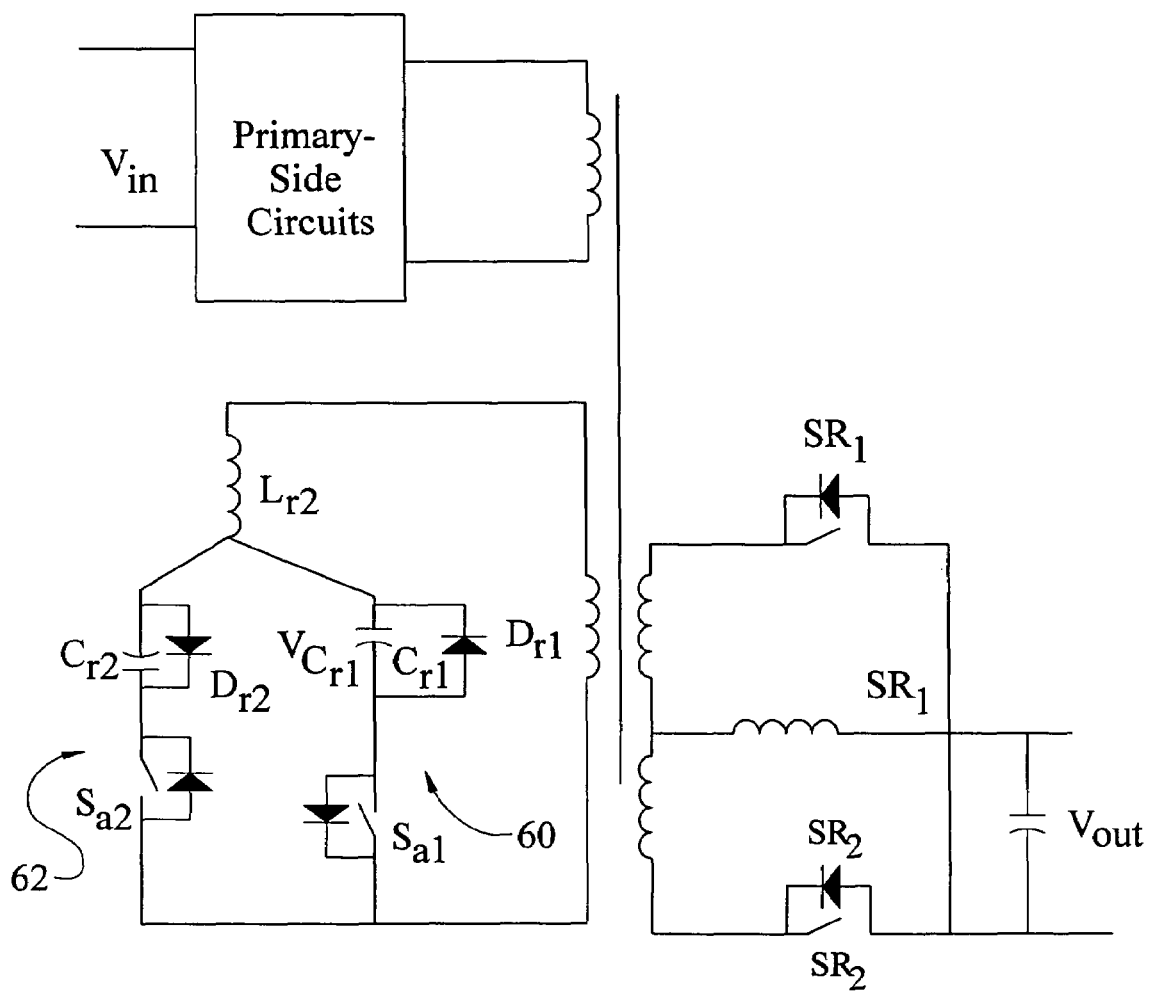

FIG. 10d includes simplified ART cells 60 and 62 in parallel with an additional winding, as shown. FIG. 10d is a dc-dc converter with a center-tapped rectifier, similar to FIG. 9b.

The energy commutation in FIGS. 10a-d is carried out via magnetic coupling between the primary, secondary, and additional windings. As previously stated, the resonant inductance of FIGS. 10a-d may be external inductance, leakage inductance, or a combination of both.

FIGS. 11a and b show multiple ART cells connected in parallel with additional windings. FIG. 11a shows ART cells 64 and 66 in parallel with additional windings coupled to primary-side circuits via the transformer. FIG. 11a is a dc-dc converter with a current doubler rectifier, similar to FIG. 8c.

Figure 11B:
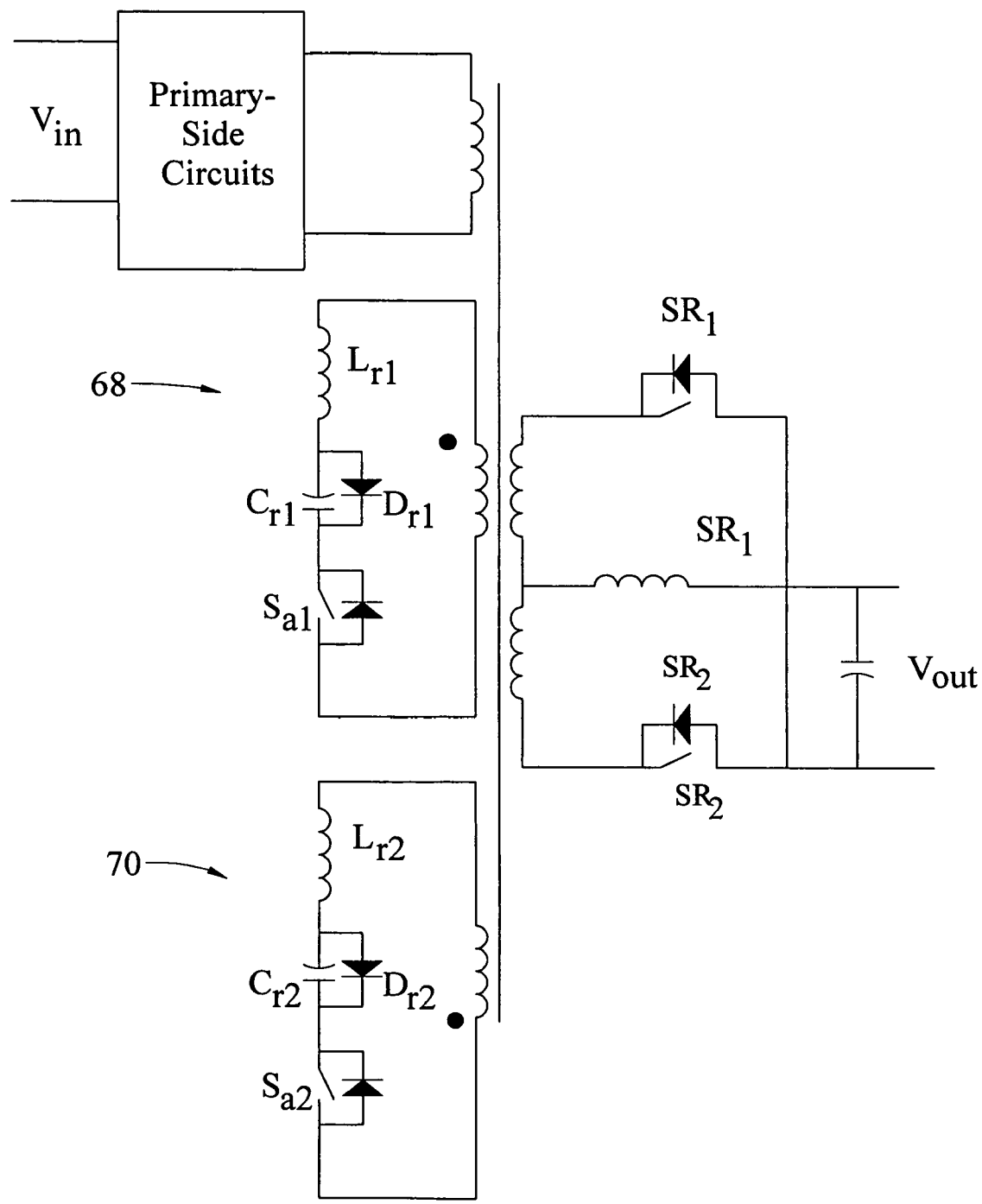

FIG. 11b includes ART cells 68 and 70 in parallel with additional windings coupled to primary-side circuits via the transformer, as shown. FIG. 11b is a dc-dc converter with a center-tapped rectifier, similar to FIG. 8d.

As shown by FIGS. 11a and b, two ART cells can be connected in parallel with two additional windings. In the examples of FIGS. 11a and b, both N-channel MOSFETS can be utilized for auxiliary switches with a grounded source for easier driving. It is again noted that the resonant inductance in the ART cells of FIGS. 11a and b, may be external inductance, leakage inductance, or a combination of both.

A prototype buck converter was built to test a disclosed topology. The prototype specification included $V_{in}$=48V, $V_o$=32V, and $I_o$=0-4A. Output filter inductance L=44 uH, $S_1$ and SR were selected as Si7454DP MOSFETs, and S was an Si7439DP P-channel MOSFET. $L_r$=1.5 uH, $C_r$=2 nF, and the switching frequency was 300 kHz. Compared with a conventional buck converter without an ART cell, the buck converter with an ART cell, in accordance with the present disclosure, shows improvement in conversion efficiency.

The description of the present disclosure is merely exemplary and those skilled in the art will appreciate that variations other than those described will fall within the scope of the present disclosure. For example, FIG. 12 shows an alternate embodiment of an ART cell at 72. ART cell 72 differs from the ART cells described above in that a diode D is connected in parallel with a capacitor $C_r$ of an LC tank and active switch S; while the ART cells described above include a diode D connected in parallel with the capacitor $C_r$ of the LC tank. Such a difference results in ART cell 72 having a lower free wheeling conduction loss compared to the ART cells described above. In addition, ART cell 72 allows the switch S to turn off regardless of the polarity of the resonant inductor current. This is in contrast to the ART cells described above, which are designed to turn off S only when the resonant inductor current goes negative. Turning off S only when the resonant inductor current goes negative in the ART cells above prevents over voltage stress on switch S; this is not a concern for ART cell 72. ART cell 72 also has slightly less parasitic ringing compared to the ART cells described above. ART cell 72 may replace any of the ART cells in any of the applications described above.

What is claimed is:

1. A DC-DC converter comprising:
   a first inductor;
   a synchronous rectifier connected to the inductor;
   a first switch connected to the inductor and the synchronous rectifier; and
   an active resonant tank cell including a second switch, a second inductor and a capacitor, the second inductor and the capacitor coupled in series with the second switch, the active resonant tank cell connected to the synchronous rectifier in parallel.

2. The converter of claim 1, wherein the synchronous rectifier and first switch are MOSFET devices.

3. The converter of claim 1, wherein the converter is one of a buck converter, a boost converter, and a buck-boost converter.

4. The converter of claim 1, wherein the converter is an isolated converter.

5. The converter of claim 1, wherein the active resonant tank cell further includes a diode connected in parallel to the capacitor.

6. The converter of claim 1, wherein the active resonant tank cell further includes a diode connected in parallel to the capacitor and the second switch.

7. The converter of claim 4, wherein the converter is one of a forward converter, a flyback converter, a flyback converter, a half-bridge converter, a push-pull converter, and a full-bridge converter.

8. A dc-dc converter comprising:
   a transformer having a primary winding and a secondary winding;
   a synchronous rectifier connected to the secondary winding; and
   a first active resonant tank cell connected across the primary winding, the first active resonant tank cell including a switch, an inductor and a capacitor, the inductor and the capacitor connected in series with the switch.

9. The converter of claim 8, wherein the synchronous rectifier is a MOSFET device.

10. The converter of claim 8, wherein the first active resonant tank cell further includes a diode connected in parallel to the capacitor.

11. The converter of claim 8, wherein the first active resonant tank cell further includes a diode connected in parallel to the capacitor and the switch.

12. The converter of claim 8, wherein the switch is a MOSFET device.

13. The converter of claim 8, wherein the converter is a forward converter.

14. The converter of claim 8, wherein the converter is a flyback converter.

15. The converter of claim 8, wherein the converter is a half-bridge converter.

16. The converter of claim 8, wherein the converter is a push-pull converter.

17. The converter of claim 8, wherein the converter is a full-bridge converter.

18. The converter of claim 8, further including a second active resonant tank cell connected across the primary winding, the second active resonant tank cell including a second switch connected in series with a second capacitor.

19. The converter of claim 8, further including a second synchronous rectifier connected to the secondary winding.

20. A dc-dc converter comprising:
a transformer having a primary winding and a secondary winding;
a synchronous rectifier connected to the secondary winding;
an external winding electromagnetically coupled to the primary winding and the secondary winding; and
a first active resonant tank cell connected across the external winding, the first active resonant tank cell including a switch, an inductor and a capacitor. the inductor and the capacitor connected in series with the switch.

21. The converter of claim 20, wherein the synchronous rectifier is MOSFET device.

22. The converter of claim 20, wherein the first active resonant tank cell further includes a diode connected in parallel to the capacitor.

23. The converter of claim 20, wherein the first active resonant tank cell further includes a diode connected in parallel to the capacitor of and the switch.

24. The converter of claim 20, wherein the switch is a MOSFET device.

25. The converter of claim 20, wherein the converter is a forward converter.

26. The converter of claim 20, wherein the converter is a flyback converter.

27. The converter of claim 20, wherein the converter is a half-bridge converter.

28. The converter of claim 20, wherein the converter is a push-pull converter.

29. The converter of claim 20, wherein the converter is a full-bridge converter.

30. The converter of claim 20, further including a second synchronous rectifier connected to the secondary winding.

31. The converter of claim 1, wherein the converter is configured to reverse a current through the synchronous rectifier while the synchronous rectifier is on and the first switch is off.

32. The converter of claim 1, wherein the converter is configured to prevent a body diode of the synchronous rectifier from conducting a body diode current when the synchronous rectifier turns off.

33. The converter of claim 1, wherein the converter is configured to discharge a junction capacitance of the first switch while the first switch is off.

34. The converter of claim 1, wherein the converter is configured to charge a junction capacitance of the synchronous rectifier after the synchronous rectifier is turned off.

35. The converter of claim 1, wherein the active resonant tank cell is charged through the first switch when the second switch is off.

36. The converter of claim 18, wherein the first and second active resonant tank cells share an inductor.

37. The converter of claim 20, further comprising a second active resonant tank cell coupled to the first active resonant tank cell in parallel.

38. The converter of claim 35, wherein the first and second active resonant tank cells share an inductor.

* * * * *